(12) United States Patent
Harviainen et al.

(10) Patent No.: US 11,741,673 B2
(45) Date of Patent: Aug. 29, 2023

(54) METHOD FOR MIRRORING 3D OBJECTS TO LIGHT FIELD DISPLAYS

(71) Applicant: InterDigital Madison Patent Holdings, SAS, Paris (FR)

(72) Inventors: Tatu V. J. Harviainen, Helsinki (FI); Marko Palviainen, Espoo (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/298,324

(22) PCT Filed: Nov. 26, 2019

(86) PCT No.: PCT/US2019/063443
§ 371 (c)(1),
(2) Date: May 28, 2021

(87) PCT Pub. No.: WO2020/112900
PCT Pub. Date: Jun. 4, 2020

(65) Prior Publication Data
US 2022/0068023 A1    Mar. 3, 2022

Related U.S. Application Data

(60) Provisional application No. 62/774,062, filed on Nov. 30, 2018.

(51) Int. Cl.
*G06T 19/00*    (2011.01)
*G06T 7/70*    (2017.01)
(Continued)

(52) U.S. Cl.
CPC .......... *G06T 19/00* (2013.01); *G06F 3/04845* (2013.01); *G06F 3/1462* (2013.01);
(Continued)

(58) Field of Classification Search
None
See application file for complete search history.

(56) References Cited

U.S. PATENT DOCUMENTS 5,589,980 A    12/1996    Bass et al.
5,956,180 A     9/1999    Bass et al.
(Continued)

FOREIGN PATENT DOCUMENTS

CN    104238119 A    12/2014
CN    104380347 A     2/2015
(Continued)

OTHER PUBLICATIONS

International Search Report and Written Opinion of the International Searching Authority for PCT/US2019/063443 dated Jun. 24, 2020, 18 pages.
(Continued)

Primary Examiner — Saptarshi Mazumder
(74) Attorney, Agent, or Firm — Smadar Gefen

(57) ABSTRACT

Systems and methods are described for mirroring 3D content from a first display (which may be a handheld 2D display) to a second display (which may be a 3D display, such as a light field display). The 3D content is initially displayed (e.g. as a 2D projection) on a the first display. The relative positions and/or orientations of the first and second displays are determined. The position of a user viewing the content may also be determined or may be inferred from the position and orientation of the first display. The second display is provided with information used to display the 3D content with a size and/or orientation that preserves the original apparent size and/or apparent orientation of that content from the perspective of the user.

20 Claims, 23 Drawing Sheets

(51) Int. Cl.
  *H04N 13/302* (2018.01)
  *H04N 13/366* (2018.01)
  *G06F 3/04845* (2022.01)
  *G06F 3/14* (2006.01)

(52) U.S. Cl.
  CPC ............ *G06T 7/70* (2017.01); *H04N 13/302* (2018.05); *H04N 13/366* (2018.05)

(56) References Cited

U.S. PATENT DOCUMENTS

| | | | |
|---|---|---|---|
| 6,906,762 | B1 | 6/2005 | Witehira et al. |
| 7,802,195 | B2 | 9/2010 | Saul |
| 7,953,462 | B2 | 5/2011 | Vartanian et al. |
| 8,068,886 | B2 | 11/2011 | Vartanian |
| 8,427,396 | B1 | 4/2013 | Kim |
| 8,479,226 | B1 | 7/2013 | Cave |
| 8,576,276 | B2 | 11/2013 | Bar-Zeev et al. |
| 8,711,091 | B2 | 4/2014 | Nomura et al. |
| 8,730,354 | B2 | 5/2014 | Stafford et al. |
| 8,988,343 | B2 | 3/2015 | Fei et al. |
| 9,367,224 | B2 | 6/2016 | Ananthakrishnan |
| 10,019,849 | B2 * | 7/2018 | Berman ............... H04N 13/368 |
| 2003/0080923 | A1 | 5/2003 | Suyama et al. |
| 2004/0004623 | A1 * | 1/2004 | Miller ................... G06T 15/503 345/592 |
| 2005/0146787 | A1 | 7/2005 | Lukyanitsa |
| 2008/0291225 | A1 | 11/2008 | Arneson |
| 2009/0079765 | A1 | 3/2009 | Hoover |
| 2010/0053164 | A1 | 3/2010 | Imai |
| 2010/0321275 | A1 | 12/2010 | Hinckley et al. |
| 2010/0328447 | A1 | 12/2010 | Waston |
| 2011/0157555 | A1 | 6/2011 | Mashitani et al. |
| 2011/0199460 | A1 | 8/2011 | Gallagher |
| 2011/0221962 | A1 | 9/2011 | Khosravy et al. |
| 2012/0040719 | A1 * | 2/2012 | Lee ....................... G06F 1/1626 455/557 |
| 2012/0084652 | A1 | 4/2012 | Martinez Bauza |
| 2012/0127284 | A1 | 5/2012 | Bar-Zeev et al. |
| 2012/0146894 | A1 | 6/2012 | Yang et al. |
| 2012/0276998 | A1 | 11/2012 | Zhu |
| 2013/0155210 | A1 | 6/2013 | Ma |
| 2013/0300637 | A1 | 11/2013 | Smits et al. |
| 2014/0055353 | A1 | 2/2014 | Takahama |
| 2014/0232829 | A1 | 8/2014 | Lee |
| 2014/0320399 | A1 | 10/2014 | Kim et al. |
| 2015/0061998 | A1 | 3/2015 | Yang et al. |
| 2015/0123996 | A1 | 5/2015 | Ohashi |
| 2015/0170419 | A1 | 6/2015 | Ohashi |
| 2015/0198808 | A1 | 7/2015 | Morifuji et al. |
| 2015/0243078 | A1 | 8/2015 | Watson |
| 2015/0278999 | A1 | 10/2015 | Summers |
| 2016/0078506 | A1 * | 3/2016 | Sesti ................... G06Q 30/0603 705/27.2 |
| 2016/0103326 | A1 | 4/2016 | Kimura et al. |
| 2016/0239975 | A1 | 8/2016 | Lui et al. |
| 2017/0111678 | A1 | 4/2017 | Hwang |
| 2018/0101966 | A1 | 4/2018 | Lee |
| 2019/0035363 | A1 * | 1/2019 | Schluessler ............... G06T 1/20 |

FOREIGN PATENT DOCUMENTS

| | | | |
|---|---|---|---|
| CN | 104508538 | A | 4/2015 |
| EP | 2869573 | A4 | 12/2015 |
| JP | 2014170374 | A | 9/2014 |
| WO | WO2011109903 | A1 | 9/2011 |
| WO | WO2012147702 | A1 | 11/2012 |

OTHER PUBLICATIONS

Invitation to Pay Additional Fees and, Where Applicable, Protest Fee, for PCT/US2019/063443 dated Mar. 6, 2020, 11 pages.

Kara, Peter A., et al., "The Interdependence Of Spatial And Angular Resolution In The Quality Of Experience Of Light Field Visualization". IEEE International Conference on 3D Immersion (IC3D), (2017), 8 pages.

Bregović, Robert, et. al., "Architectures and Codecs for Real-Time Light Field Streaming". Journal of Imaging Science and Technology, vol. 61, No. 1, Jan. 2017, 12 pages.

Silberman, Nathan, et al., "Indoor Segmentation And Support Inference From RGBD Images". European Conference on Computer Vision, (2012), pp. 746-760.

Song, Shuran, et. al., "Deep Sliding Shapes For Amodal 3d Object Detection In RGB-D Images". Proceedings of the IEEE Conference on Computer Vision and Pattern Recognition, (2016), pp. 808-816.

Kar, Abhishek, et al. "Skeletal Tracking Using Microsoft Kinect". Methodology, vol. 1, No. 1, (2010), pp. 1-11.

Zhang, Zhengyou. "Microsoft Kinect Sensor And Its Effect". IEEE Multimedia, vol. 19, No. 2, Feb. 2012, pp. 4-10.

Hürst, Wolfgang, et al., "Gesture-Based Interaction Via Finger Tracking For Mobile Augmented Reality". Multimedia Fools and Applications, vol. 62, No. 1, (2013), 233-258.

Czupryński, Błażej, et. al., "High Accuracy Head Pose Tracking Survey". International Conference on Active Media Technology, (2014), pp. 407-420 (14 pages).

Gupta, Lalit, et. al., "Gesture-Based Interaction And Communication: Automated Classification Of Hand Gesture Contours". IEEE Transactions on Systems, Man, and Cybernetics, Part C (Applications and Reviews), vol. 31, No. 1, Feb. 2001, pp. 114-120 (7 pages).

Flack, Julien, et al., "Architecture For High Performance Stereoscopic Game Rendering On Android". Stereoscopic Displays and Applications XXV, International Society for Optics and Photonics, vol. 9011, 2014 (11 pages).

Anonymous, "Amazon Fire Phone Dynamic Perspective 3D Demo". Web Link available at: https://vimeo.com/98661674, dated Jun. 19, 2014, 28 pages.

Anonymous, "NVidia 3DTV Play, (n.d.)", Retrieved Jul. 6, 2016, from http://www.nvidia.com/object/3dtv-play-overview.html.

Park, "Undistorted Projection onto Dynamic Surface", Division of Electrical and Computer Engineering, Hanyang University, Dec. 2006, 10 pages.

Anonymous, "NVidia 3D Vision, (n.d.)" Retrieved Aug. 8, 2016, from https://www.nvidia.com/object/3d-vision-main.html.

Bullis, "Bendable Displays are Finally Headed to Market", MIT Technology Review, available at: http://www, technologyreview.com/news/529991/bendable-displays-are-finally-headed-to-market/, Aug. 13, 2014, 5 pages.

Yongtian et al., "Outdoor Augmented Reality And Its Application In Digital Reconstruction Of Yuanmingyuan", Bulletin of National Natural Science Foundation of China 2, (2006), 16 pages.

Radle et al., "HuddleLamp: Spatially-Aware Mobile Displays for Ad-hoc Around-the-Table Collaboration". Proceedings of the 2014 ACM International Conference on Interactive Tabletops and Surfaces, Nov. 2014, pp. 15-54.

Nacenta, "E-conic: A Perspective-Aware Interface for Multi-Display Environments", YouTube link available at: https://www.youtube.com/watch?v=BX9Wc64F-Rs, Published on Dec. 17, 2008, 50 pages.

Wolf et al., "Non-homogeneous Content-driven Video-retargeting", The School of Computer Science, Tel-Aviv University, (2007), 7 pages.

Salzmann et al., "Convex Optimization for Deformable Surface 3-D Tracking", In: Computer Vision, (2007), ICCV 2007, IEEE 11th International Conference on, IEEE, (2007), pp. 1-8.

Raskar et al., "The Office of the Future: A Unified Approach to Image-Based Modeling and Spatially Immersive Displays", Computer Graphics Proceedings, SIGGRAPH 98, Jul. 19-24, 1998, pp. 1-10.

International Search Report and the Written Opinion of the International Searching Authority for PCT/US2016/054931 dated Dec. 19, 2016, 11 pages.

Alexander et al., "Tilt Displays: Designing Display Surfaces with Multi-Axis Tilting and Actuation", MobileHCI, 12, ACM, Sep. 2012, pp. 161-170.

(56) References Cited

OTHER PUBLICATIONS

Takashima et al., "A Shape-Shifting Wall Display that Supports Individual and Group Activities", Technical Report 2015-1072-05, Department of Computer Science, University of Calgary, (2015), 8 pages.
Amadeo, "Report: Google X working on seamless, modular large-format displays", Available at: http://arstechnica.com/gadgets/2014/10/03/report-google-x-working-on-seamless-modular-large-format-displays/, Oct. 3, 2014, 3 pages.
Jones, et al., "IllumiRoom: Peripheral Projected Illusions for Interactive Experiences", Proceedings of the SIGCHI Conference on Human Factors in Computing Systems, ACM, 2013, pp. 869-878.
Sakurai et al., "A Middleware for Seamless Use of Multiple Displays", Springer-Verlag, (2008), pp. 252-266.
Anonymous, "The Future of Display Technology from CES 2015", Available at: http://pureimage.ca/future-display-technology-ces-2015/, (2015). 4 pages.
Figl et al., "The Control Unit for a Head Mounted Operating Microscope Used for Augmented Reality Visualization in Computer Aided Sugery", Proceedings of the 1st International Symposium on Mixed and Augmented Reality Sep. 30, 2002; pp. 1-7.
Anonymous "MIT's Junkyard Jumbotron Turns Your Motley Collection of Devices into One Large Display (video)", Engadget web article, Mar. 14, 2011, 37 pages.
International Preliminary Report on Patentability for PCT/US2016/054931 completed on Sep. 15, 2017, 16 pages.
Nacenta et al., "E-conic: A Perspective-Aware Interface for Multi-Display Environments", UIST' 07, Oct. 2017, ACM 978-1-59593-679, pp. 279-288.
Lee, "castAR Augmented Reality Glasses Hit Kickstarter With A Clip-On That Transforms Them into A VR Headset", Web article posted online on Oct. 14, 2013. Retrieved from; http://www.engadget.com/2013/10/14/castar-kickstarter-launch/, 4 pages.
Alfaro, "Surround Vision: A handheld screen for accessing peripheral content around the TV", Massachusetts Institute of Technology Thesis, Sep. 2010, available at: http://web.media.mit.edu/~vmb/papers/alfaroms.pdf, pp. 1-68.
Rolland et al., "Multifocal planes head-mounted displays", Appl. Opt. 39, 3209-3215, 2000, pp. 3209-3215.

\* cited by examiner

METHOD FOR MIRRORING 3D OBJECTS TO LIGHT FIELD DISPLAYS

CROSS-REFERENCE TO RELATED APPLICATIONS

The present application is a national stage application under 35 U.S.C. 371 of International Application No. PCT/US2019/063443, entitled "METHOD FOR MIRRORING 3D OBJECTS TO LIGHT FIELD DISPLAYS", filed on Nov. 26, 2019, which claims benefit under 35 U.S.C. § 119(e) from U.S. Provisional Patent Application No. 62/774,062 (filed Nov. 30, 2018), entitled "METHOD FOR MIRRORING 3D OBJECTS TO LIGHT FIELD DISPLAYS," which is incorporated herein by reference in its entirety.

BACKGROUND

Autostereoscopic displays such as light field displays are capable of allowing the human eyes to see spatial information without the necessity of wearing special glasses. A visualized light field may be perceived within a given angle measured from the direction of the screen, known as the field of view (FOV). Horizontal-Only Parallax (HOP) light field displays or full-parallax displays may provide angle-continuous visuals horizontally and vertically. For example, a light field display may provide 180 degrees FOV in horizontal direction and 90 degrees FOV in vertical direction.

SUMMARY

Solutions that support combined use of 2D displays and light field displays may be particularly useful. For example, 2D displays may be available in mobile devices whereas light field displays may be available in physical environments such as in homes, offices, or vehicles. It may be useful to enable users of 2D displays to exploit the visualization capabilities of light field displays for the purpose of presenting content that may normally be consumed on mobile devices and 2D displays. It may be useful to enable the transfer of content to light field displays that are capable of providing separate views simultaneously for viewers in different viewing directions. Transferring 3D objects from a 2D display to a light field display may call for scaling and/or rotating the 3D objects to achieve the desired size and orientation on the light field display. It may be particularly useful to consider the size difference between a 2D display and a light field display when scaling of sizes of 3D objects. In addition, it may be preferable to allow multiple users to mirror objects to the light field display's FOV so that each mirrored 3D object is presented for the viewing direction of the corresponding user.

Systems and methods are described for mirroring 3D objects to a light field display. Some embodiments include a fast preview for mirrored objects in a light field display. In some embodiments, motion and gesture-based adjustment of 3D mirroring parameters is provided.

In some embodiments, the scale and orientation of mirrored content are based on the sizes and relative orientation of displays. Some embodiments operate to create the effect of moving an actual object by preserving the size and orientation of 3D objects from a given perspective.

In some embodiments, the relative positions of a source device and a light field display are used to control the positioning of content when moved from the source device to the light field display. In some embodiments, 3D mirroring content from a source device to a light field display includes sending data identifying the 3D content along with scale and orientation parameters without sending the 3D content itself.

Some embodiments may operate to enhance the use of light field displays together with mobile devices and 2D displays. Some embodiments operate to provide more realistic representations of digital 3D objects.

In some embodiments, a method is provided for mirroring a 3D object from a first display to a second display. The method includes determining a relative orientation and a relative size of the first and second display. The method further includes selecting a 3D mirroring mode. The method further includes calculating a set of view parameters based on the relative orientation, the relative size, and the 3D mirroring mode. The method further includes transmitting to the second display a description of the 3D object and the set of view parameters. In some embodiments, the set of view parameters includes an orientation parameter. In some embodiments, the set of view parameters includes a scale parameter. In some embodiments, determining a relative orientation includes determining a relative location based on a SLAM model produced at the first display, wherein the SLAM model identifies the location of the second display. In some embodiments, determining a relative orientation includes determining a relative orientation using a smart space. In some embodiments, the method further includes determining the location of a viewer relative to the first and second display, wherein calculating the set of view parameters is based on the location of the viewer. In some embodiments, the set of view parameters is calculated so that the apparent size of the 3D object on the first display is equal to the apparent size of the 3D object on the second display from the determined location of the viewer. In some embodiments, the set of view parameters is calculated so that the orientation of the 3D object on the first display is equal to the orientation of the 3D object on the second display from the determined location of the viewer.

In some embodiments, a method for mirroring 3D objects from a first display to a second display is provided. The method includes receiving from the first display a 3D content description. The method further includes receiving from the first display a set of viewing parameters. The method further includes receiving 3D content based on the received 3D content description. The method further includes rendering, at the second display, a light field visualization based on the received 3D content and the set of viewing parameters. In some embodiments, the set of viewing parameters include an orientation parameter. In some embodiments the set of viewing parameters includes a scale parameter. In some embodiments, the method further includes determining the relative orientation of the first and second display. In some embodiments, receiving 3D content includes receiving 3D content based on the relative orientation of the first and second display. In some embodiments, the method further includes tracking the relative location of the first display. In some such embodiments, rendering a light field visualization includes rendering a light field visualization based on the relative location of the first display.

EXAMPLE NETWORKS FOR IMPLEMENTATION OF THE EMBODIMENTS

Figure 1A:
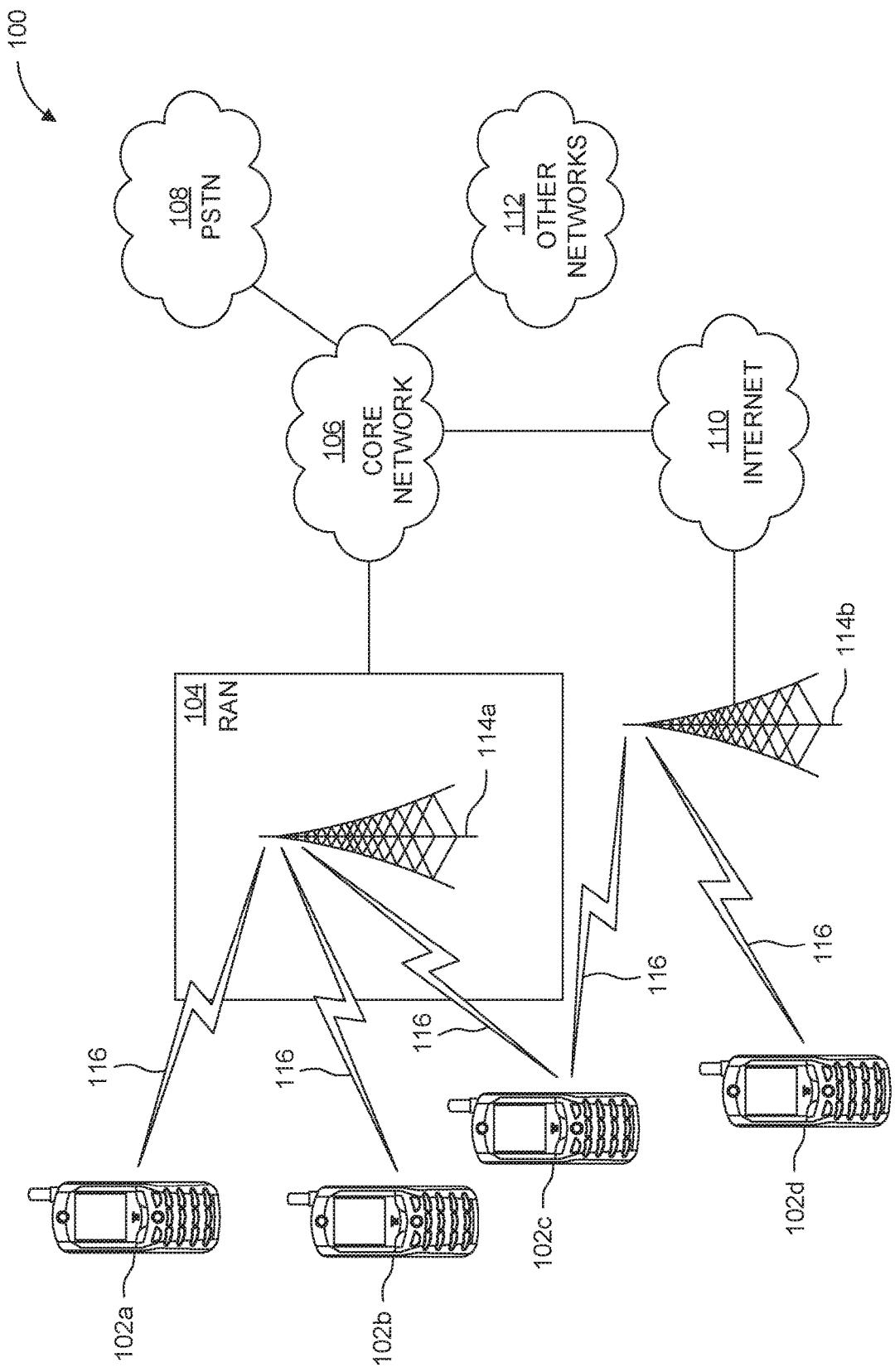
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
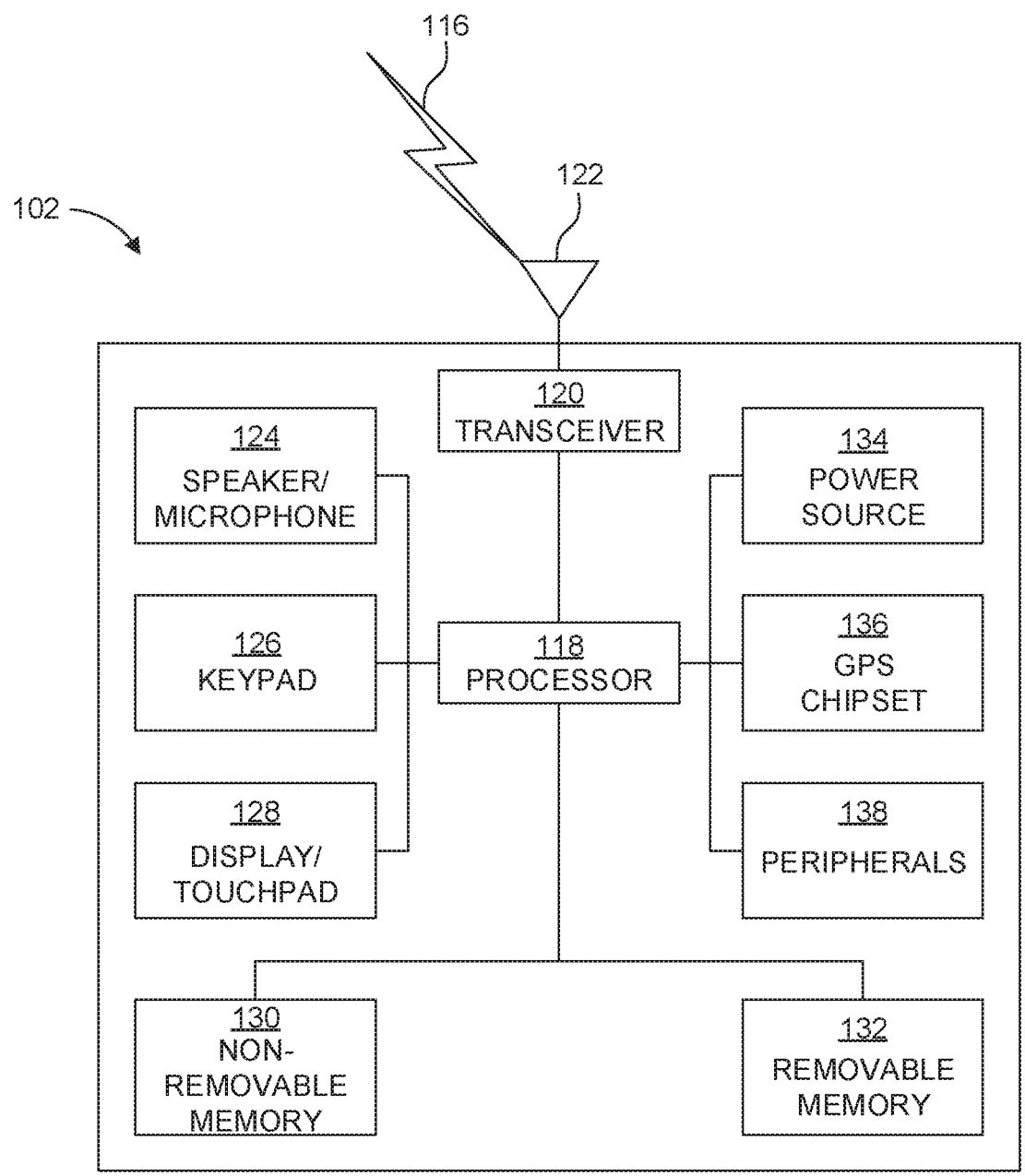
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
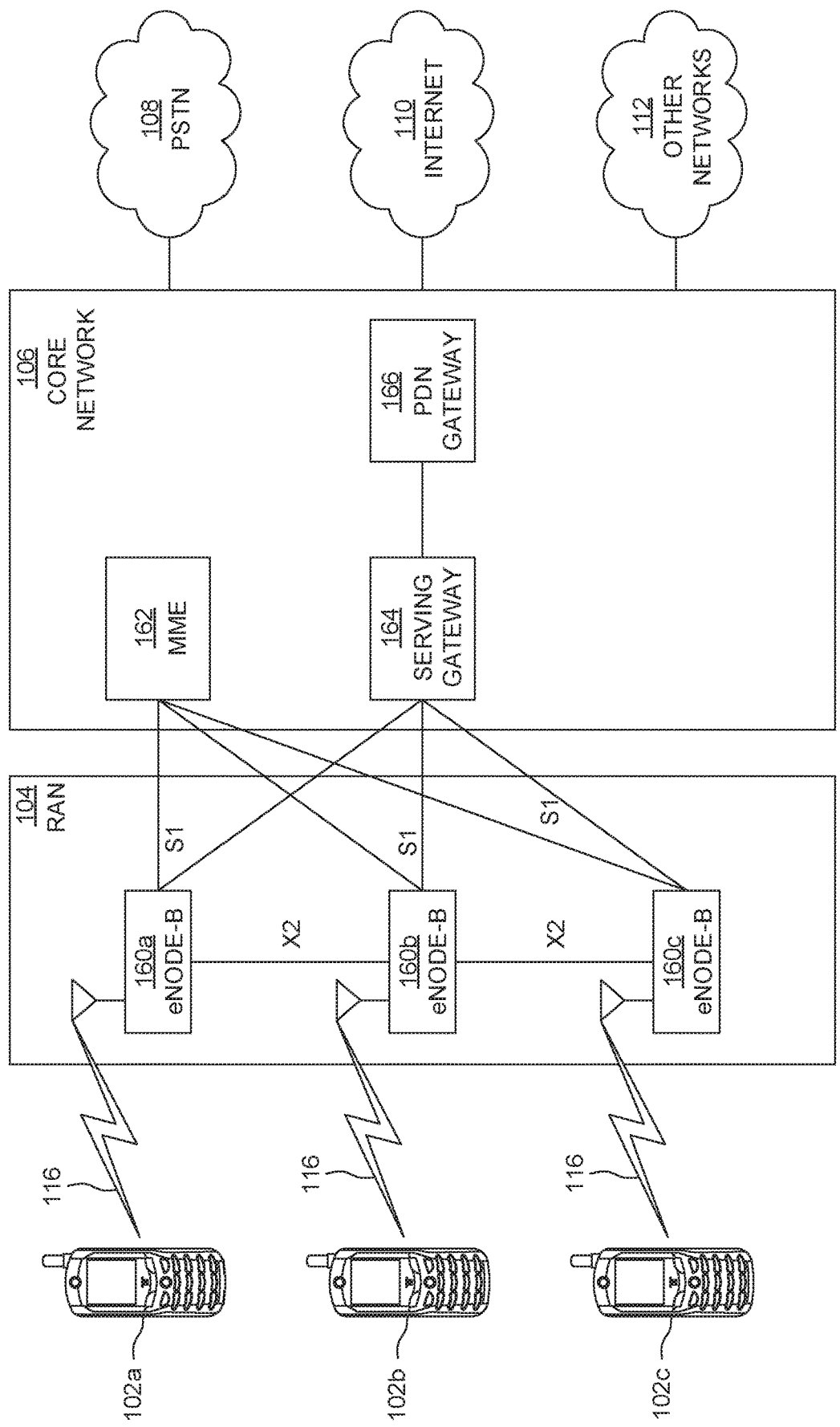
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
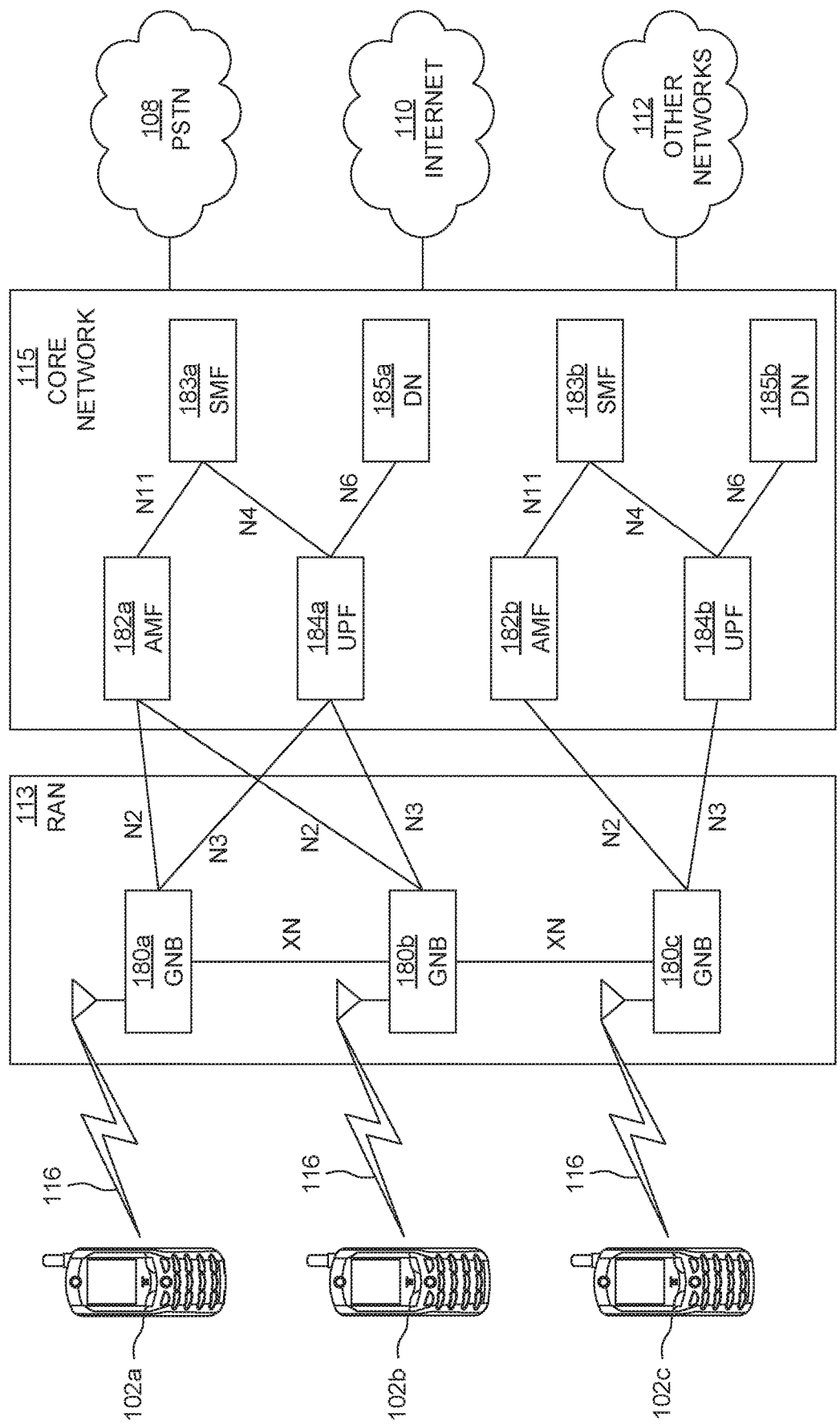
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

In some embodiments, a method of 3D mirroring enables setting the initial size, orientation, and location for 3D objects that are mirrored to a light field display. In some embodiments, a primary viewing direction of a 3D object, or "object normal," is determined. The object normal may be, for example, the direction perpendicular to the main surface of the object. A 3D object can be transformed by comparing the surface of a 2D display that is displaying the 3D object to be mirrored and the object normal. The mirrored 3D content may be configured so that the normal of the 3D content is oriented towards the location of the viewer relative to a light field display. The size of the mirrored 3D content may depend, for example, on its relative size in the 2D display. For example, 3D content that is presented in full-screen mode in a 2D display may be mirrored and presented in full-screen mode in a light field display. In some embodiments, the size of the 3D content is scaled based on the distance between the viewer and center-point of a light field display. For example, the 3D content may be scaled larger for longer viewing distances. In some embodiments, the depth of 3D objects in a light field display may be initially adjusted so that clipping of 3D objects is minimized in different viewing directions.

In some embodiments, the FOV and physical surroundings of a light field display may be partitioned. For example, the FOV of the light field display may be divided to provide separate views, e.g., for different users, for various 3D objects, and/or for presenting views of 3D objects in different orientations (e.g., a front-view and a side-view).

Some embodiments operate to enable the adjustment of parameters for mirroring 3D objects to a light field display. For example, a user may adjust the size and orientation of a mirrored 3D object in a light field display.

Some embodiments operate to enable fast switching to the 3D mirroring mode. For example, a quick preview light field visualization of a 3D object may be provided first, and a full quality light field visualization may be provided after.

1. Overview of Some 3D Mirroring Embodiments

1.1 3D Mirroring Zone

Figure 2:
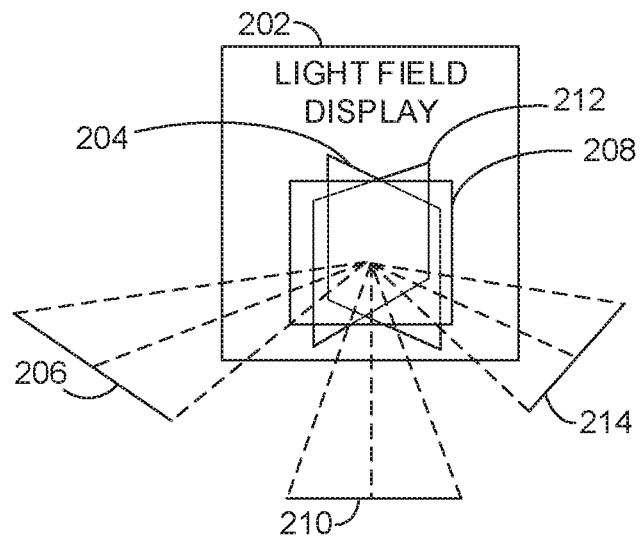
FIG. 2 depicts an example of a light field display with 3D mirroring zones, in accordance with some embodiments.

A light field display's FOV may be shared for a desired number of 3D mirroring zones. Each mirroring zone may present mirrored 3D objects to a corresponding user. In some embodiments, a mirroring zone may provide guidance for the user to assist 3D mirroring. For example, FIG. 2 depicts a light field display 202 providing a 180-degrees field of view (FOV) in horizontal direction that is shared by three 3D mirroring zones. Each mirroring zone may be used to mirror 3D objects (e.g., in mirroring of car models) to a light field display. A 3D mirroring zone may be implemented in a light field display, e.g., as an angular view array. 3D objects appearing in a 3D mirroring zone may only be visible for the viewers that are in the viewing direction of that 3D mirroring zone. Thus, a 3D mirroring zone may function not only as the region where a particular user's content is mirrored in the 3D display but also as a privacy function wherein mirrored content can be limited to a particular FOV for viewing. As examples, a first virtual object 204 may be visible from within zone 206, a second virtual object 208 may be visible from within zone 201, and a third virtual object 212 may be visible from within zone 214.

Various 3D mirroring actions may be useful in different situations of mirroring content to a light field display. As a first example, a Limited 3D mirroring action may be implemented so that mirroring content to one 3D object mirroring zone results in the display of content that is visible only to the viewers that are in the same zone. As a second example, a Broadcasted 3D mirroring action may be implemented so that a person in one 3D object mirroring zone can make content visible for all the viewers of a light field display (e.g. by displaying content to multiple or all 3D mirroring zones of a light field display).

Figure 3:
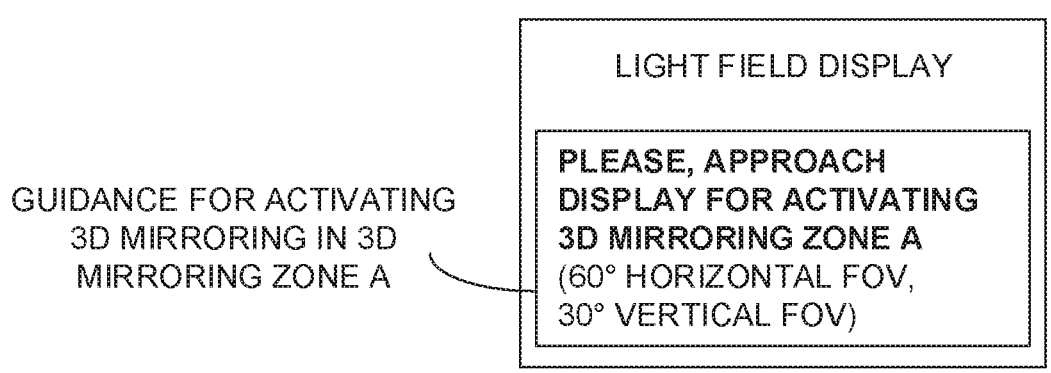
FIG. 3 illustrates an example of presenting a user with guidance for activating 3D mirroring in a 3D mirroring zone, in accordance with some embodiments.

In some embodiments, a 3D mirroring zone may be used to present a guidance for activating 3D mirroring in a light field display. A 3D mirroring zone can provide guidance for the user before 3D mirroring is activated in the light field display, e.g. when the user enters the 3D mirroring zone. FIG. 3 illustrates an example of presenting a user with guidance for activating 3D mirroring in a 3D mirroring zone, in accordance with some embodiments.

Figure 16:
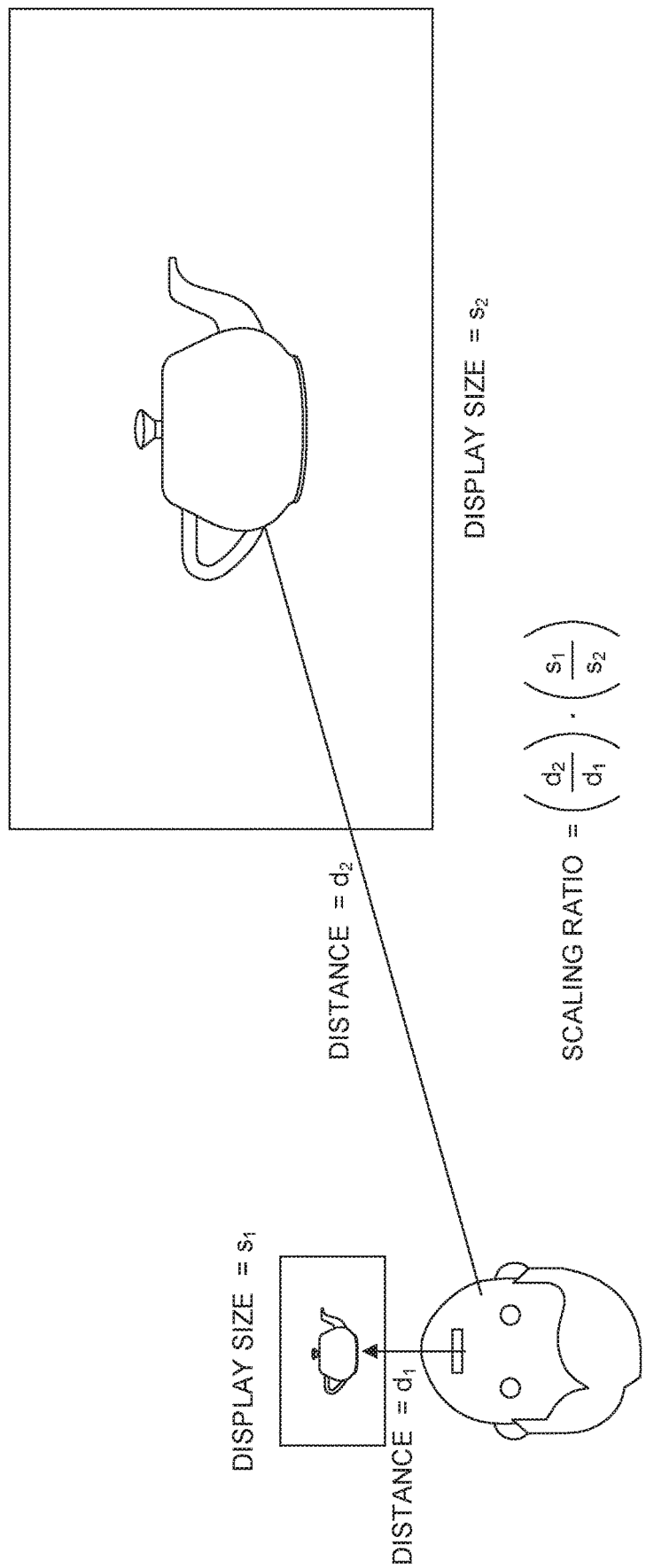
FIG. 16 depicts an example scenario for calculating a scaling ratio based on the sizes of two displays and the distance from each display to the viewer, in accordance with some embodiments.

In some embodiments, a 3D mirroring zone may be used to present a preview for a light field visualization of a mirrored 3D object. An initial size, orientation and location, including depth, for a mirrored 3D object may be determined. For example, the orientation of the 3D content may be determined based on the orientation of 3D object in a 2D display and based on the location of the viewer relative to a light field display. For example, for a 2D display displaying 3D content, the normal to the display may be determined in order to obtain a normal to the 3D content. The orientation of the mirrored 3D content may be calculated so that the normal of the 3D content is oriented towards the location of the viewer relative to a light field display. The relative location of the user may be detected, for example, using RGB-D camera feed(s) captured of the room. The determination of the initial size of a mirrored 3D object may be based on the size of displays and/or viewing distances. In some embodiments, the size of the mirrored 3D content may depend on its relative size in a 2D display. For example, a 3D content that is presented in full-screen mode in a 2D display can be mirrored and presented in a full-screen mode in a light field display. In some embodiments, the initial size of the 3D object may depend on the detected viewing distance. For example, mirrored 3D objects may be scaled bigger in order to achieve better visibility for longer viewing distances. An example scale calculation for a mirrored 3D object, in accordance with some embodiments, is depicted in FIG. 16.

Figure 4:
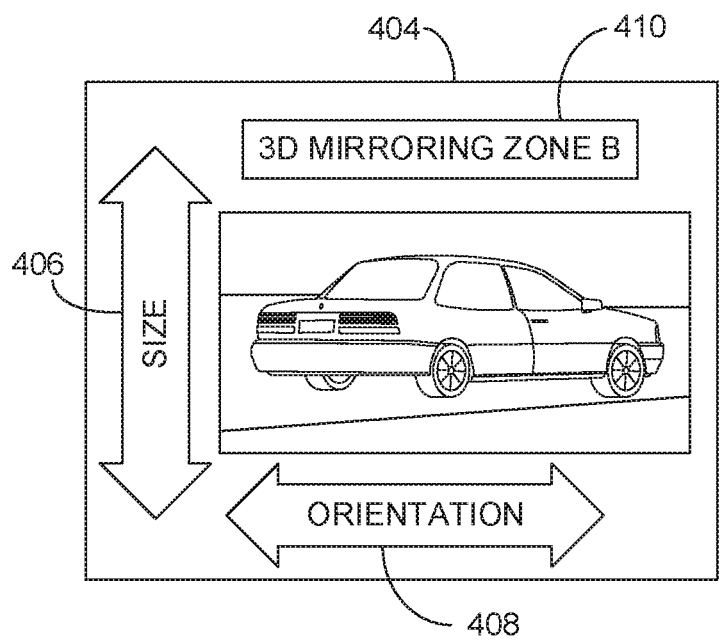
FIG. 4 depicts an example preview view of a mirrored 3D object presented in a light field display.

FIG. 4 depicts an example preview view of a mirrored 3D object 402 presented in a light field display 404. A preview view may provide a low-quality light field visualization for a 3D object. The preview may provide guidance to the user, e.g., an indication 406 that the size of the 3D object is adjustable and an indication 408 that the orientation of the 3D object is adjustable. Where different mirroring zones are used, an indication 410 may be displayed of which zone is being controlled. In some embodiments, the user may perform motion and gesture-based adjustment of 3D mirroring parameters. For example, a user may increase the size of a 3D object by moving towards the center point of the light field display or decrease the object's size by moving away from the center point of the display.

Figure 5:
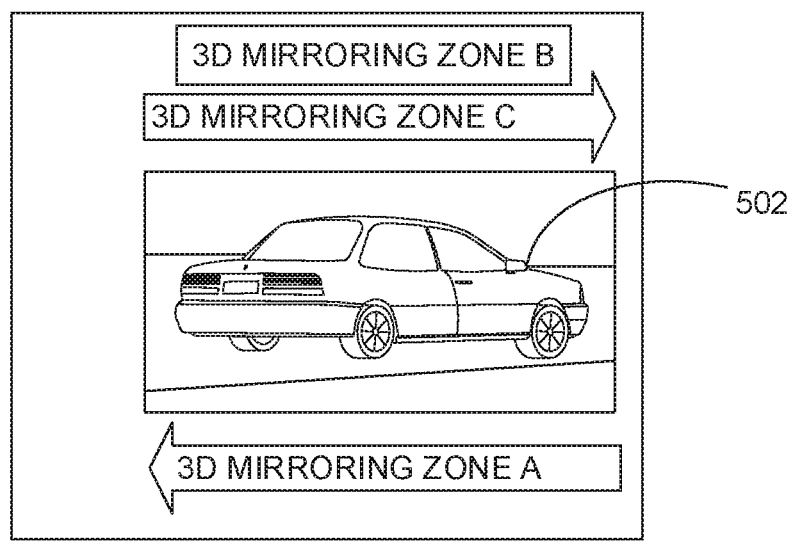
FIG. 5 depicts a 3D mirroring zone presenting a full light field visualization for a mirrored 3D object, in accordance with some embodiments.

After 3D mirroring is fully prepared, a high-quality light field visualization of a mirrored 3D object may be provided. FIG. 5 depicts a 3D mirroring zone presenting a high-quality light field visualization for a mirrored 3D object 502, in accordance with some embodiments. As shown in the example, information may be provided regarding other 3D mirroring zones, e.g., zones that present to other viewing directions of the light field display.

1.2 Viewer Description

A viewer description describes a viewer detected in a room in which the light field display is located. The viewer description may, for example, be used to control orientation of content inside a light field display.

A viewer description may contain the following information. A viewer identifier field may include a unique identifier for the detected viewer. A viewer name field may include a name for the detected viewer in the room. A web address for 3D object viewing service field may include a Web address (e.g., a URL) for a 3D object viewing service that the viewer uses for viewing 3D objects. An identifier for 3D object field may include an identifier for a 3D object to be mirrored to the light field display. The viewer description may also contain information regarding the viewer's position relative to a light field display and/or information regarding the mobile device's position relative to the center point of a light field display.

1.3 3D Mirroring Zone Description

A 3D mirroring zone description may contain the following information. A name field may include a name (e.g., "3D mirroring zone A") for the 3D mirroring zone. A bounds for the 3D mirroring zone in the FOV field may include the horizontal and vertical position and size for the 3D mirroring zone in the field of view of the light field display. A maximum viewing distance field may include the maximum viewing distance for the named mirroring zone in relative to the center point of the light field display.

1.4 3D Display Description

A 3D display description may contain the following information. A display's spatial resolution field may provide the spatial resolution that is supported by the light field display. A display's angular resolution field may provide the angular resolution that is supported by the light field display. For example, the angular resolution of a light field display may be 0.5 degrees or 2 views per degree. A display's horizontal FOV field may describe the horizontal field of view (e.g., in degrees) to which it is possible to display images from the light field display. A display's vertical FOV field may describe the vertical field of view (e.g., in degrees) to which it is possible to display images from the light field display. A best viewing direction for the display field may be provided. For example, the front-side of the display may be defined to be the best viewing direction for the light field display. The 3D display description may include one or more 3D mirroring zone description(s), as previously described. For example, in the simplest case, one 3D mirroring zone is provided for the light field display.

1.5 Named Mirroring Zone Description

A named mirroring zone description may contain the following information. A name field may include a descriptive name (e.g., "Front-view" or "Side view") for the named mirroring zone of a 3D object. A preferred bounds for the named mirroring zone in the FOV field may include the preferred horizontal and vertical position and size for the named mirroring zone in the field of view. A maximum viewing distance field may provide a maximum viewing distance for the named mirroring zone in relative to the center point of the light field display. A preferred size of the 3D object field may provide a preferred size for the 3D object that is presented in the named mirroring zone in the light field display. A preferred orientation for the 3D object field may provide a preferred orientation for the 3D object relative to a light field display that is presented in the named mirroring zone in the light field display. In some embodiments, the preferred orientation of the 3D object may be based on the relative location of the viewer or mirror source. A preferred location for the 3D object field may provide a preferred location for the 3D object that is presented in the named mirroring zone in the light field display.

1.6 3D Mirroring Model

A 3D mirroring model may include the following information. An associated viewer fora named mirroring zone field may identify the viewer for which the 3D mirroring model is provided. Because the orientation of a 3D object in a 3D mirroring zone may depend on the relative position of the viewer that is mirroring 3D content to a light field display, the associated viewer fora named mirror zone field may be utilized to establish a preferred orientation for a mirrored 3D object based that viewer's relative position. An identifier for 3D object field may include an identifier for a 3D object to be mirrored to the light field display. A 3D mirroring mode field may include the value of a 3D mirroring mode, e.g., "limited 3D mirroring mode" or "broadcasted 3D mirroring mode". In a limited 3D mirroring mode, the mirrored 3D content is configured to be visible only to the viewers of the corresponding zone. In a broadcasted 3D mirroring mode, the 3D content is mirrored to all 3D mirroring zones of the light field display. A size of 3D object in 2D display field may describe the size of 3D object in the 2D display relative to the full 2D display size. This information may be utilized in order to display the mirrored 3D object onto a light field display with a specific initial size. For example, the 3D object may be displayed so that it appears to the viewer to remain the same size when mirrored. An orientation of 3D object in 2D display field may include the orientation of the 3D object projected to the 2D display. This information may be utilized to enable rotation of the mirrored 3D object to a particular orientation. For example, the mirrored 3D object may be displayed so that it appears to the viewer to remain at the same orientation when mirrored. A low-quality 3D model for the object field may describe a low-quality 3D model for a 3D object to be mirrored to the light field display. For example, the 3D model may be used for providing a preview for the 3D object in the light field display. A high-quality 3D model for the object field may describe a high-quality 3D model for a 3D object to be mirrored to the light field display. For example, this 3D model can be used for providing a high-quality light field visualization of the 3D object. A named mirroring zone descriptions field may contain one or more named mirroring zone descriptions, as previously described, for the 3D object to be mirrored to the light field display.

2. Example Architecture for Some Embodiments

Figure 6:
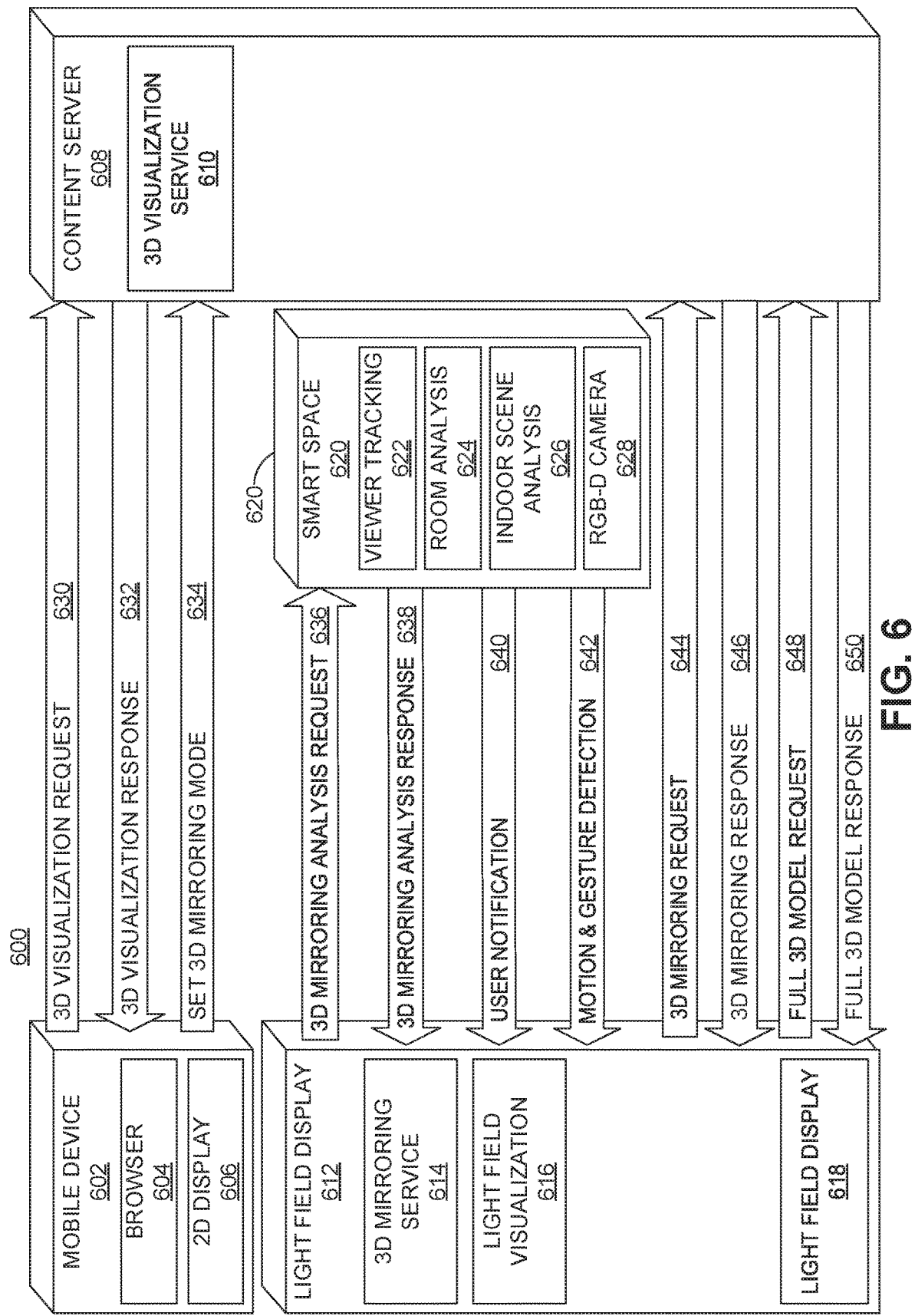
FIG. 6 is a schematic representation of an environment for mirroring 3D objects from a mobile device to a light field display, in accordance with some embodiments.

FIG. 6 is a schematic representation of an example environment for mirroring 3D objects from a mobile device to a light field display, in accordance with some embodiments. As shown in the example of FIG. 6, the environment 600 includes a mobile device 602 with an internet connection. Mobile device 602 includes a browser 604, and a 2D display 606. The browser 604 may be a software module that is capable of fetching 3D content from the server side (e.g. content server 608 with 3D visualization service 610) and representing 3D content in the 2D display of the mobile device. The 2D display 606 may be used in the output of visual content from the mobile device. The environment 600 also includes a light field display 612 with an internet connection. The light field display 612 includes a 3D mirroring service module 614, a light field visualization module 616, and a light field display module 618. The 3D mirroring service 614 may be a software module that orchestrates the mirroring of 3D objects to a light field display. The light field visualization 616 may be a software module that operates to produce a light field visualization, e.g., for a 3D model of a mirrored 3D object. The light field display 618 is used to output the light field visualizations.

In some embodiments, the relative orientation of a viewer may be used to control the orientation of the 3D content mirrored to a light field display. Utilizing the relative orientation between the viewer and corresponding display(s) may call for capabilities to obtain this data. In some embodiments, a light field display operates to obtain relative orientation of the viewer. In some embodiments, a smart space is used to obtain information regarding the relative orientation of the viewer. Internet connections may be used to enable the modules of a light field display to obtain this data from the smart space for use in 3D mirroring. The environment 600 depicted in FIG. 6 includes a smart space 620 with a viewer tracking module 622, a room analysis module 624, and an indoor scene analysis module 626, and RGB-D camera(s) 628. The RGB-D camera(s) 628 may include sensors that operate to provide an RGB-D (color video and depth) video feed of the viewers in the room. The viewer tracking module 622 is a service that operates to track positions of different viewers in the room, e.g. by using the video feeds of RGB-D cameras 628. In some embodiments, the viewer tracking module 622 may track positions of mobile devices of tracked viewers in the room. The room analysis module 624 may operate to prepare a room model for the viewing environment. The indoor scene analysis module 626 may operate to interpret the major surfaces, objects, and support relations of an indoor scene from an RGB-D image. The indoor scene analysis module 626 may operate using existing indoor scene analysis methods.

FIG. 6 additionally depicts an example flow of information between components in the environment 600. For example, at 630, mobile device 602 send a 3D visualization request to content server 608. At 632, the content server provides the mobile device a 3D visualization response. At 634, the 3D mirroring mode is provided from the mobile device to the content server. At 636, light field display 612 sends a 3D mirroring analysis request to smart space 620. In some embodiments, the 3D mirroring analysis request includes a 3D display description. At 638, the smart space provides a 3D mirroring analysis response to the light field display 612. In some embodiments, the 3D mirroring analysis response includes 3D mirroring zone descriptions. At 640, the smart space provides a user notification (e.g. including a viewer description) to the light field display 612. At 642, the smart space may provide motion and gesture detection information to the light field display. Motion and gesture detection information may include, for example, a user ID, detected motion(s), and/or detected gestures. At 644, light field display 612 sends a 3D mirroring request to the server 608. In some embodiments, the 3D mirroring request includes a viewer description and 3D display description. At 646, content server 608 provides a 3D mirroring response to the light field display. In some embodiments, the 3D mirroring response includes a 3D mirroring model. At 648, the light field display sends a full 3D model request to the server 608, which may include, e.g. a 3D object identifier. At 650, the server provides a full 3D model response to the light field display 618.

3. Example Processes

Figure 7A:
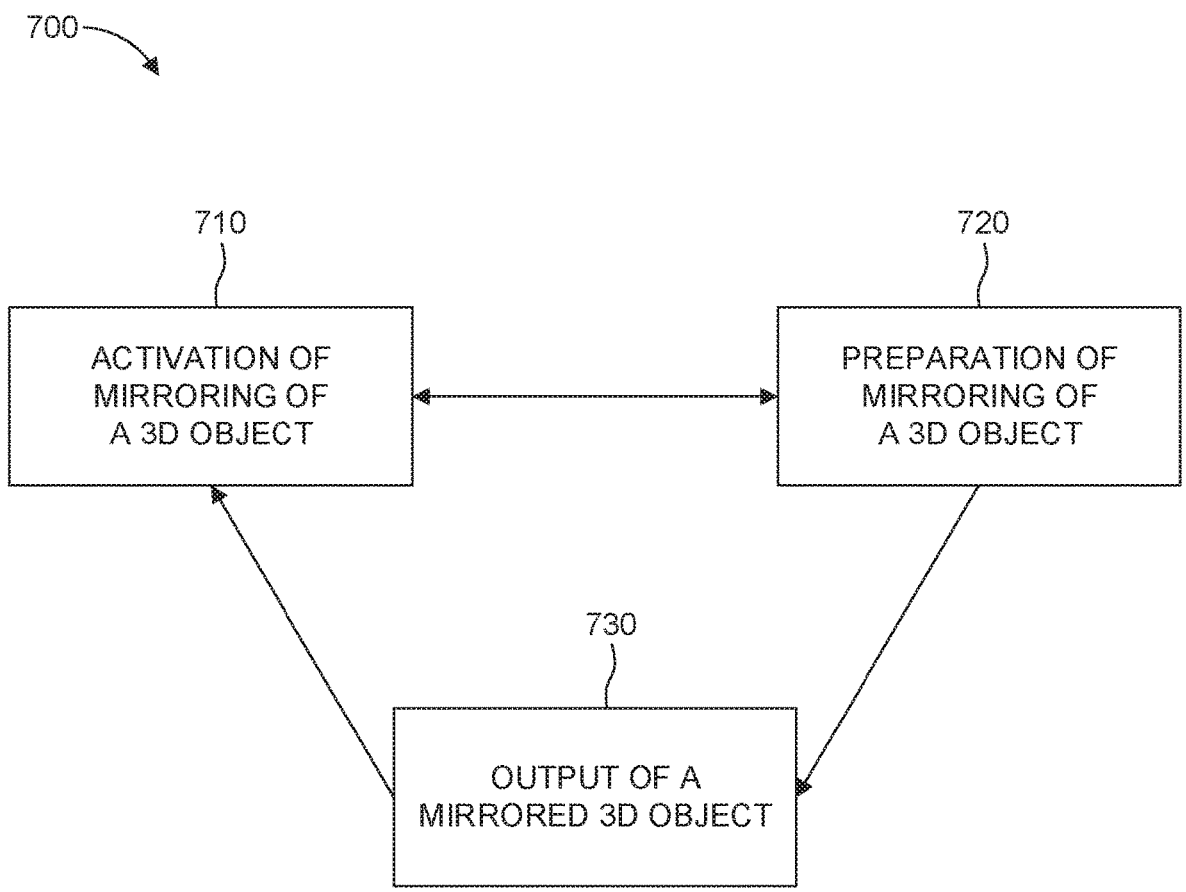
FIG. 7A depicts an overview of a process for mirroring 3D objects to a light field display, in accordance with some embodiments.

FIG. 7A depicts an overview of a process for mirroring 3D objects to a field of view of a light field display, in accordance with some embodiments. In some embodiments, the process includes providing a fast preview of mirrored objects in a light field display. In some embodiments, the process includes motion and gesture-based adjustment of 3D mirroring parameters.

Referring to FIG. 7A, the example process 700 includes a set of subprocess: the activation of mirroring of a 3D object at 710, the preparation of mirroring of a 3D object at 720, and the outputting of a mirrored 3D object at 730. The subprocesses are described in greater detail in the sections below.

3.1 Activation of Mirroring of a 3D Object

Figure 7B:
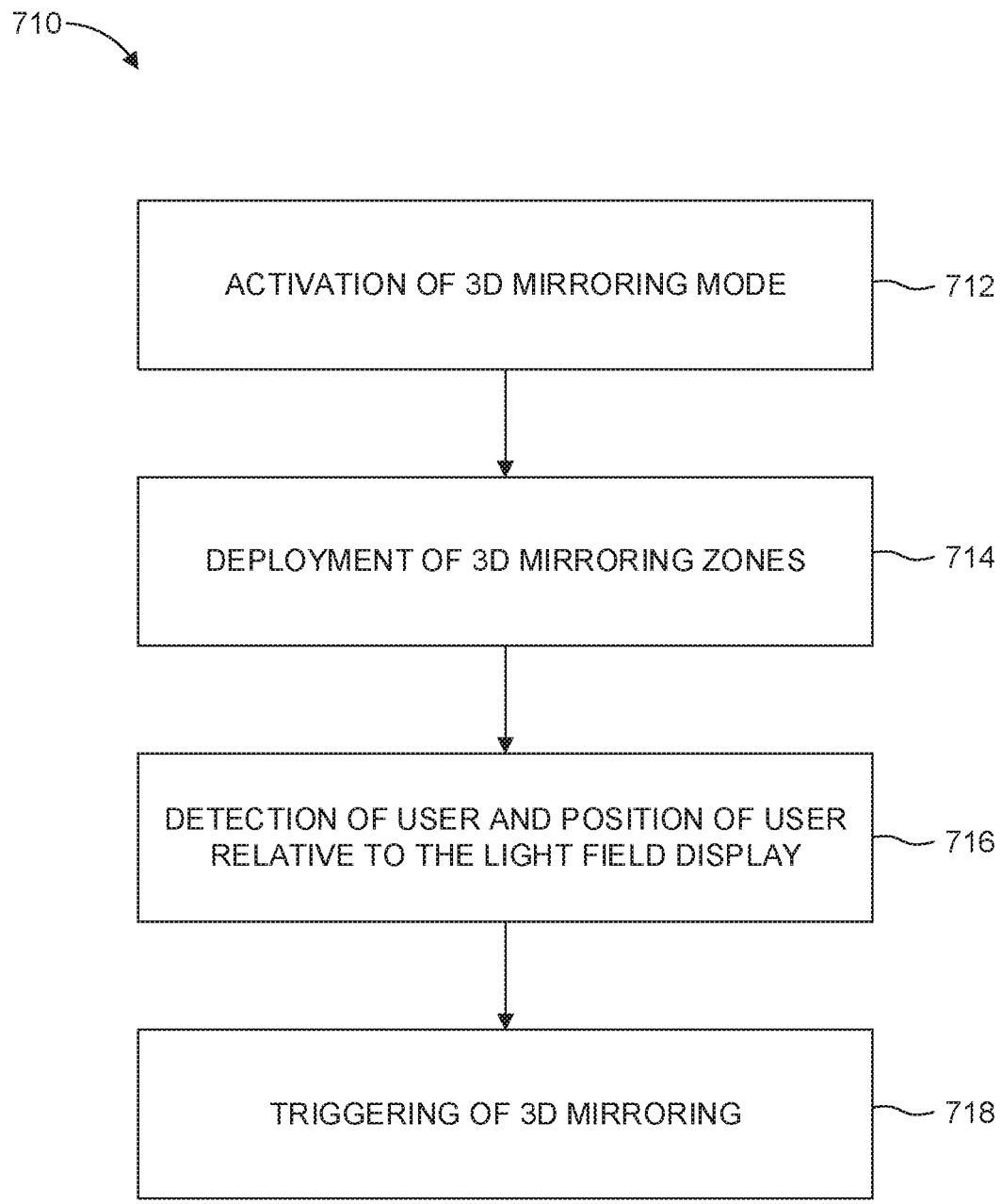
FIG. 7B depicts an example subprocess for the activation of mirroring of a 3D object, in accordance with some embodiments.

FIG. 7B depicts an example subprocess for the activation of mirroring of a 3D object, in accordance with some embodiments. In the example, the subprocess 710 includes: at 712, the activation of 3D mirroring mode; at 714, the deployment of 3D mirroring zones; at 716, the detection of a user and position of the user relative to the light field display; and, at 718, the triggering of 3D mirroring.

At 712, the subprocess 710 includes the activation of a 3D mirroring mode. In some embodiments, a 3D mirroring mode may be set, e.g., to the previously described "limited 3D mirroring mode" or "broadcasted 3D mirroring mode." For example, a user with a mobile device/goggles may select a 3D object of interest in a 3D visualization service. The user may activate a 3D mirroring by setting the 3D visualization service mode.

At 714, the subprocess 710 includes the deployment of 3D mirroring zones may include delivering, by a 3D mirroring service, a 3D mirroring analysis request for the room analysis service. The room analysis service may use a RGB-D video feed for detecting room geometry and visual obstructions that affect viewing of the light field display in the room. In some cases, the room geometry may set limitations for possible viewing distances and viewing directions. The room analysis service may produce a room model to define the possible viewing directions and viewing distances for the light field display in the room. The room analysis service may use the room model and 3D display description to determine a configuration of 3D mirroring zones, e.g. to determine the optimal orientation to maximize visibility of the 3D mirroring zones in the room. The room analysis service may return the configured 3D mirroring zones in a 3D mirroring analysis response. The preparation of the room model may be based on the existing indoor scene analysis solutions, 3D object detection approaches, and/or the RGB-D camera feeds. Scene analysis solutions that may be employed in some embodiments are described in N. Silberman et al., "Indoor segmentation and support inference from RGBD images," in: *European Conference on Computer Vision*, Springer, Berlin, Heidelberg, 2012, p. 746-760; and S. Song et al., "Deep sliding shapes for amodal 3D object detection in RGB-D images," in: Proceedings of the IEEE Conference on Computer Vision and Pattern Recognition. 2016, p. 808-816.

At 716, the subprocess 710 includes the detection of a user and position of the user relative to the light field display may include the use of a user tracking module. The user tracking module may use the RGB-D camera feed to identify the user, e.g. as the user walks to a 3D mirroring zone of the light field display. The user tracking module may detect the user's position relative to the light field display. The user tracking service may also detect a mobile device's position relative to the center point of a light field display. The user tracking service may produce a viewer description for the identified user and deliver a user notification message containing the viewer description for the 3D mirroring service. Detection of users and positions of users may be based on the RGB-D camera feeds and/or on existing skeletal tracking solutions, such as the solution described in A. Kar et al., "Skeletal tracking using Microsoft Kinect," *Methodology*, 2010, 1.1: 11, or head tracking solutions, such as the solution described in Czuprynski & Strupczewski, "High accuracy head pose tracking survey," in: *International Conference on Active Media Technology*. Springer, Cham, 2014. p. 407-420. For example, there can be used a solution supporting skeletal tracking in a room such as the Kinect sensor that incorporates several advanced sensing hardware that contains a depth sensor, a color camera, and a four-microphone array that provide full-body 3D motion capture, facial recognition, and voice recognition capabilities, such as the solution described in Z. Zhang, "Microsoft Kinect sensor and its effect," *IEEE Multimedia*, 2012, 19.2: 4-10.

At 718, the subprocess 710 includes the triggering of 3D mirroring. In some embodiments, a 3D mirroring service may use the user identity defined in the viewer description to determine a web address based on the user identity. The web address may provide access to the 3D visualization service used for viewing 3D objects on the mobile device. In addition, a link to 3D content may be shared for the 3D mirroring service. The 3D mirroring service may use the 3D mirroring zone descriptions of the 3D display description and the viewer's position relative to light field display defined in the viewer description for triggering 3D mirroring to a light field display.

In some embodiments, the triggering of 3D mirroring 718 employs proximity-based triggering. In the case of proximity-based triggering of 3D mirroring, a 3D object is automatically mirrored to the 3D mirroring zone when a user enters a named 3D mirroring zone of a light field display. For example, 3D mirroring may be triggered when the distance between the user and the display is less than a defined threshold.

In some embodiments, the triggering of 3D mirroring 718 employs tag-based triggering. In the case of tag-based triggering of 3D mirroring, the 3D mirroring service may use the camera feed captured of the environment to detect a tag, and start 3D mirroring for the 3D object defined in the tag. For example, the 3D mirroring service may detect a QR code from the mobile display device of a user in the proximity of the light field display and responsively start 3D mirroring the object defined in the QR code.

In some embodiments, the triggering of 3D mirroring 718 employs proximity and device-position-based triggering. In the case of proximity and device-position-based triggering, the 3D mirroring service may activate a "drop object" mode when a user has entered a named 3D mirroring zone of a light field display, e.g., when the distance between the user and the display is less than a defined threshold. When the "drop object" mode is activated, instructions for transferring or "dropping" a 3D object from the mobile device to the light field display may be displayed.

Figure 9:
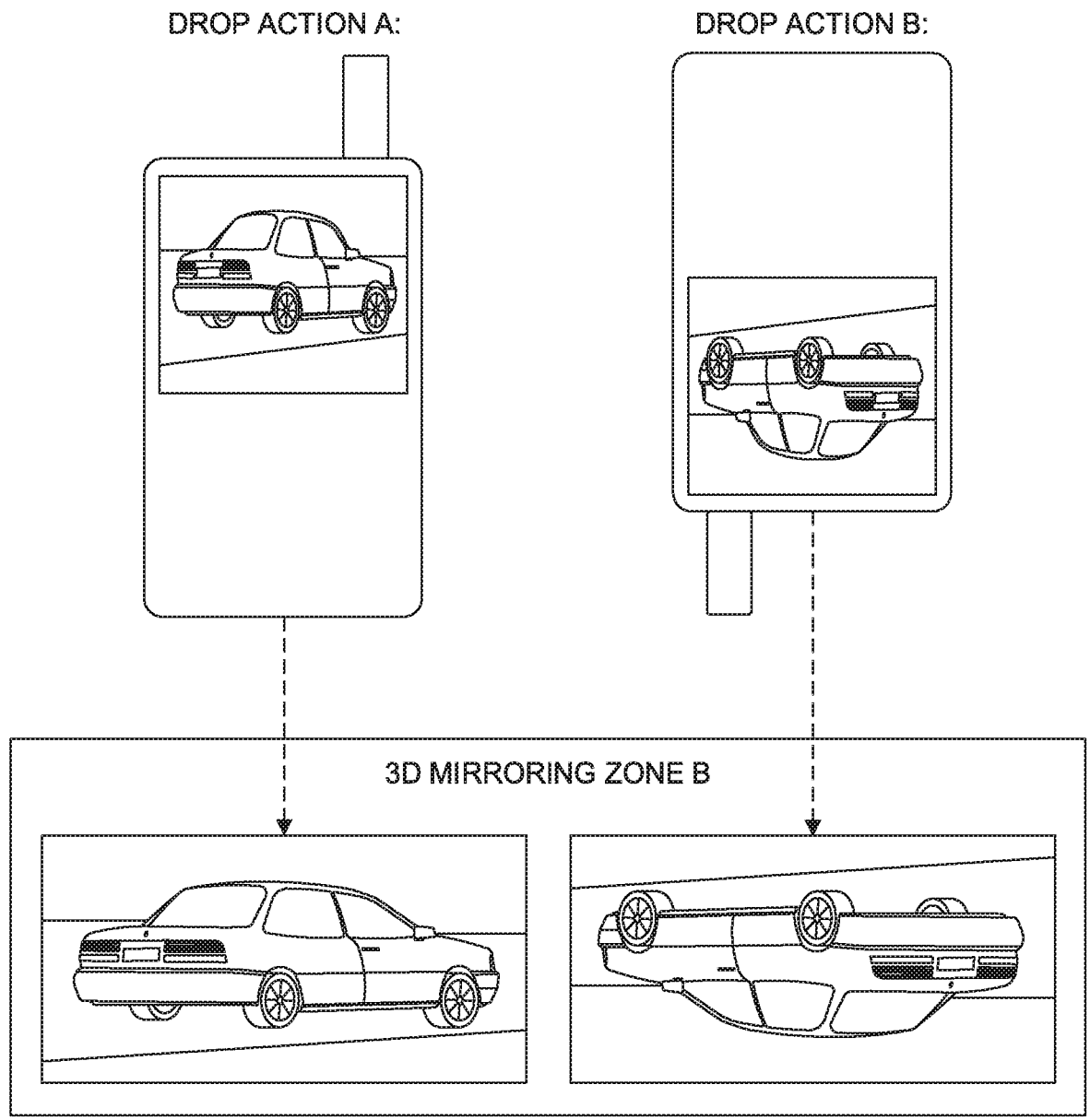
FIG. 9 depicts an example scenario of a user transferring a 3D object from a mobile device to a light field display with proximity and device-position-based triggering of 3D mirroring, in accordance with some embodiments.

FIG. 9 depicts an example scenario of a user transferring a 3D object from a mobile device to a light field display with proximity and device-position-based triggering of 3D mirroring, in accordance with some embodiments. In the example, a user puts his/her mobile device above the light field display and waits three seconds ("Drop Action A"). As a result, the object shown in the mobile device's display is "dropped" to the light field display and shown as a 3D object in the correct orientation, size, and location in the named 3D mirroring zone. The user then moves the mobile device to right, turns the mobile device upside down, and waits three seconds ("Drop Action B"). The viewer tracking module detects the device position and triggers 3D mirroring based on the new position. As a result, the object shown in the mobile device's display is "dropped" to the light field display and is shown as a 3D object in the correct orientation (upside down position), size, and location in the named 3D mirroring zone. In some embodiments, animated effects are provided in response to a drop action. For example, the "dropping of a 3D object" is visualized for the user on the 2D display and on the light field display.

3.2 Preparation for Mirroring of a 3D Object

Figure 7C:
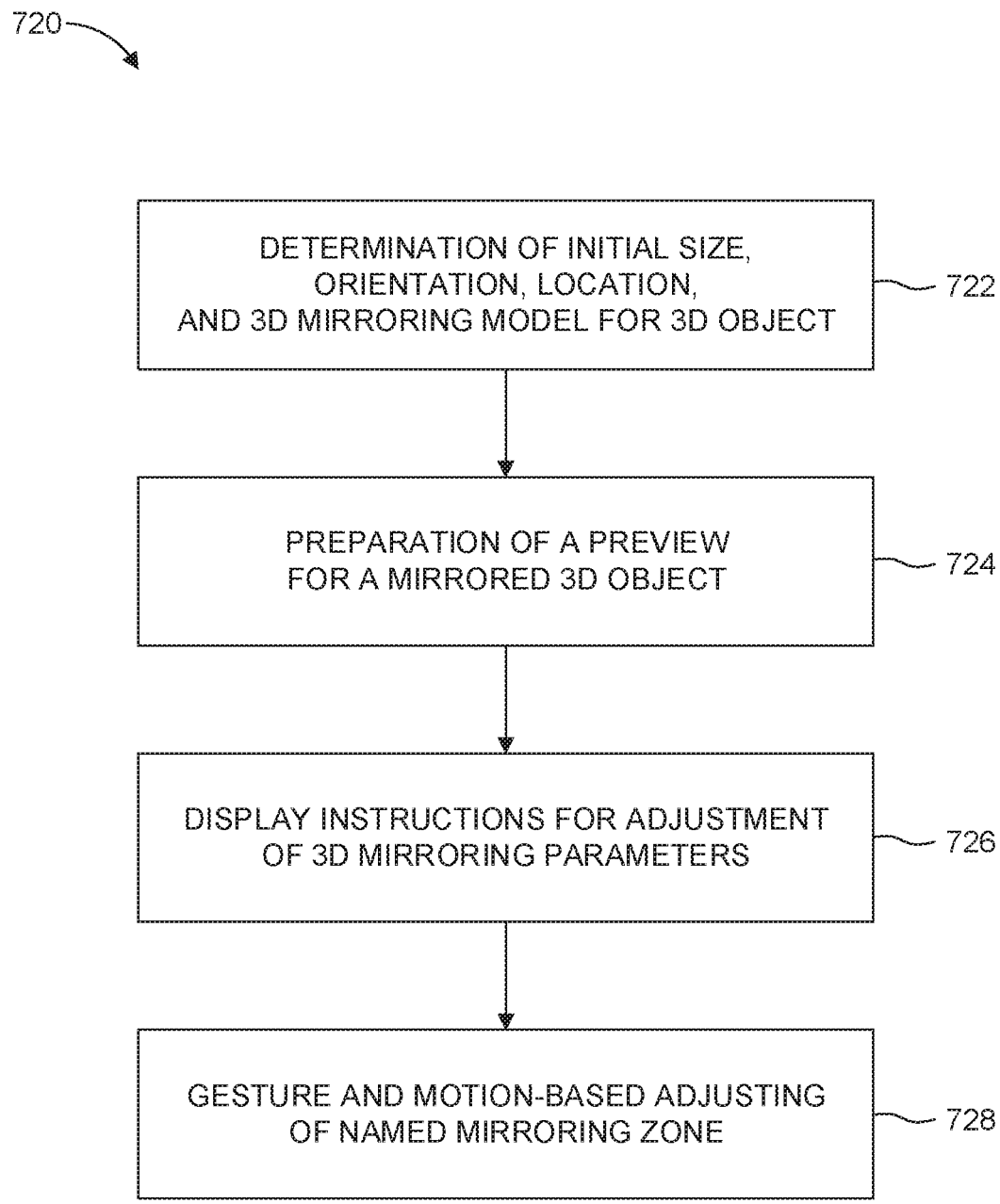
FIG. 7C depicts an example subprocess for the preparation of mirroring of a 3D object, in accordance with some embodiments.

FIG. 7C depicts an example subprocess for the preparation of mirroring of a 3D object, in accordance with some embodiments. In the example, the subprocess 720 includes: at 722, the determination of the initial size, orientation, location, and 3D mirroring model for a 3D object; at 724, the preparation of a preview for a mirrored 3D object; at 726, the display of instructions for the adjustment of 3D mirroring parameters; and, at 728, the gesture and motion-based adjusting of the named mirroring zone.

At 722, the subprocess 720 includes the determination of the initial size, orientation, location, and 3D mirroring model for the 3D object may employ a 3D mirroring service.

In some embodiments, the 3D mirroring service sends a 3D mirroring request for the 3D visualization service. The 3D visualization service may determine a 3D mirroring model and deliver the 3D mirroring model to the 3D mirroring service in a 3D mirroring response.

Determining a 3D mirroring model may include the following steps. The 3D visualization service may determine an identifier of the associated viewer for a named mirroring zone (e.g. the user that is mirroring 3D content to the light field display). The 3D visualization service may determine an identifier for a 3D object, a low quality 3D model of the 3D object, and optionally a high quality 3D model of the 3D object. The 3D visualization service may determine information about the size and orientation of the 3D object in a 2D display. The 3D visualization service may determine a user-selected 3D mirroring mode. The value of the 3D mirroring mode may be, e.g., "Limited 3D mirroring mode" or "Broadcasted 3D mirroring mode". The 3D visualization service may use the 3D display description and select 3D mirroring zones that are not yet allocated for other users. By using the viewer's position and the 3D mirroring zone descriptions, the 3D visualization service can, for example, select a 3D mirroring zone that is oriented towards the current position of the user. In the "Limited 3D mirroring mode," content may only be displayed to the associated viewer. In the "Broadcasted 3D mirroring mode" the 3D content can be defined to be mirrored to all 3D mirroring zones that are not yet allocated for other users.

One or more named mirroring zones may be selected to be used for 3D mirroring the 3D object. A named mirroring zone may be selected, for example, based on the size of the 3D mirroring zone. It may be useful to consider the type and shape of the 3D object, as well as the amount of available space for presenting the named mirroring zones in the 3D mirroring zone. For example, named mirroring zones may be provided for each of a front-view and side-view of a car. For a flat shaped object, e.g. a 3D map, a named mirroring zone may be provided for a front-view only.

In some embodiments, the initial size of mirrored 3D content is determined based on its relative size in a 2D display. For example, 3D content that is presented in full-screen mode on a 2D display may be mirrored and presented in full-screen mode in a light field display. In some embodiments, the initial size of the 3D object is determined based on the distance between the viewer and center-point of the light field display. For example, the size of the 3D object may be set bigger for longer viewing distances in order to achieve better visibility for greater viewing distances.

The orientation of the 3D object in the named mirroring zone may depend on the 3D model, mirroring zone, and the relative position of the user. In some embodiments, the orientation of a 3D object in a 2D display is used for determining the initial orientation of the 3D object, e.g. by setting the mirrored 3D object to the same orientation as it is presented in the 2D display. For example, for a 2D display showing 3D content, the normal to the display may be determined in order to obtain a normal to the 3D content. The orientation of the mirrored 3D content may be calculated so that the normal of 3D content is oriented towards the location of the viewer relative to a light field display. In some embodiments, the user can change the orientation of the 2D display in order to drop the 3D object to a light field display at a particular desired orientation. Thus, the orientation of 2D display may be used in the determination of the orientation of a mirrored 3D object in light field display.

In some embodiments, the orientation for the 3D object may be determined based on named mirroring zones. The 3D model can, for example, define a front-view, side-view, top-view, and rear-view directions for the object. These named mirroring zones corresponding to the viewing directions of the 3D object may be used so that the orientation specified for the 3D object is provided for the relative position of the user.

The determination of the initial location for the 3D object may be based on the detection of clipping of a mirrored 3D object in the angular views of 3D mirroring zone. The location (e.g., the depth of the 3D object in the light field visualization) may be initially adjusted to minimize the clipping of the 3D object.

At 724, the subprocess 720 includes the preparation of a preview for a mirrored 3D object. In some embodiments, the 3D mirroring service uses the 3D mirroring model and prepares low-quality source views for a light field visualization for the named mirroring zones defined in the 3D mirroring model. It may be preferable to enable the preparation of preview light field visualization for a mirrored 3D object in a very short time. In order to achieve this, the 3D mirroring service may operate to speed up 3D rendering to make the preparation of source views for a light field visualization faster. For example, the 3D mirroring service may first use a simplified 3D model for the 3D object in order to minimize the rendering time of source views for light field visualization. The 3D mirroring service may later download a full 3D model for the 3D object. In addition, the 3D mirroring service may use a reduced number of polygons in rendering. In some embodiments, textures may be ignored in the preparation of a preview for a mirrored 3D object. The textures may be downloaded later and used in rendering for providing a high quality visualization for a mirrored 3D object.

At 726, the subprocess 720 includes displaying instructions for adjustment of 3D mirroring parameters. In some embodiments, a 3D mirroring service provides instructions for 3D object mirroring to display to the user. For example, the provided instructions may guide the user on how to adjust 3D object mirroring in the light field display. The viewer tracking service may deliver information regarding detected motions and gestures of the user to the 3D mirroring service.

At 728, the subprocess 720 includes gesture and motion-based adjusting of the named mirroring zone. The 3D mirroring service may use the information regarding gestures and motion of the user for the purpose of adjusting the 3D mirroring parameters related to the current named mirroring zone. The user may use motion in the named mirroring zone to adjust the size of the 3D object shown in the preview of light field visualization, e.g., by moving towards or away from the display. The user may use sideward motion in the named mirroring zone, for example, to adjust the orientation of the mirrored 3D object in the light field display. The user may perform a hand gesture (e.g. a "thumb-up" hand gesture), e.g., to accept the defined 3D object mirroring parameters. Techniques that may be implemented in some embodiments for detecting hand gestures include the techniques described in Gupta & Suwei, "Gesture-based interaction and communication: automated classification of hand gesture contours," IEEE Transactions on Systems, Man, and Cybernetics, Part C (Applications and Reviews), 2001, 31.1: 114-120; and in Hurst & Van Wezel, "Gesture-based interaction via finger tracking for mobile augmented reality," Multimedia Tools and Applications, 2013, 62.1: 233-258.

3.3 Output of a Mirrored 3D Object

Figure 7D:
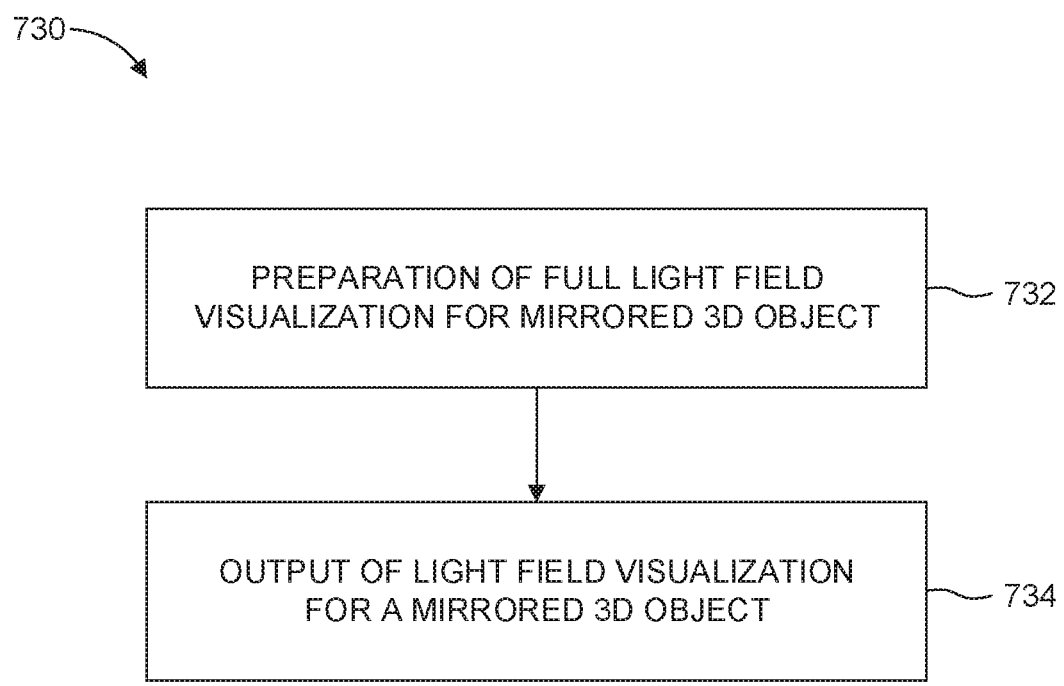
FIG. 7D depicts an example subprocess for the output of a mirrored 3D object, in accordance with some embodiments.

FIG. 7D depicts an example subprocess for the output of a mirrored 3D object, in accordance with some embodiments. In the example, the subprocess 730 includes: at 732, preparing a full light field visualization for the mirrored 3D object; and, at 734, the output of the light field visualization for the mirrored 3D object.

At 732, the subprocess 730 includes the preparation of full light field visualization for mirrored 3D object. In some embodiments, the 3D mirroring service fetches a high-quality 3D model for the mirrored 3D object. The 3D mirroring service may use the 3D model and render high quality source views for the light field visualization to present in the 3D mirroring zone of the light field display in the selected orientation, location and scale.

At 734, the subprocess 730 includes the output of a light field visualization for a mirrored 3D object. In some embodiments, the 3D mirroring service displays the light field visualization for the mirrored 3D objects and 3D mirroring zones in the light field display. The 3D mirroring service may also provide information about other 3D mirroring zones that are available in other viewing directions in the light field display.

3.4 Additional Example Methods

In some embodiments, a process includes performing a fast preview for mirrored objects in a light field display. In some embodiments, a process includes motion and gesture-based adjustment of 3D mirroring parameters.

Figure 8A:
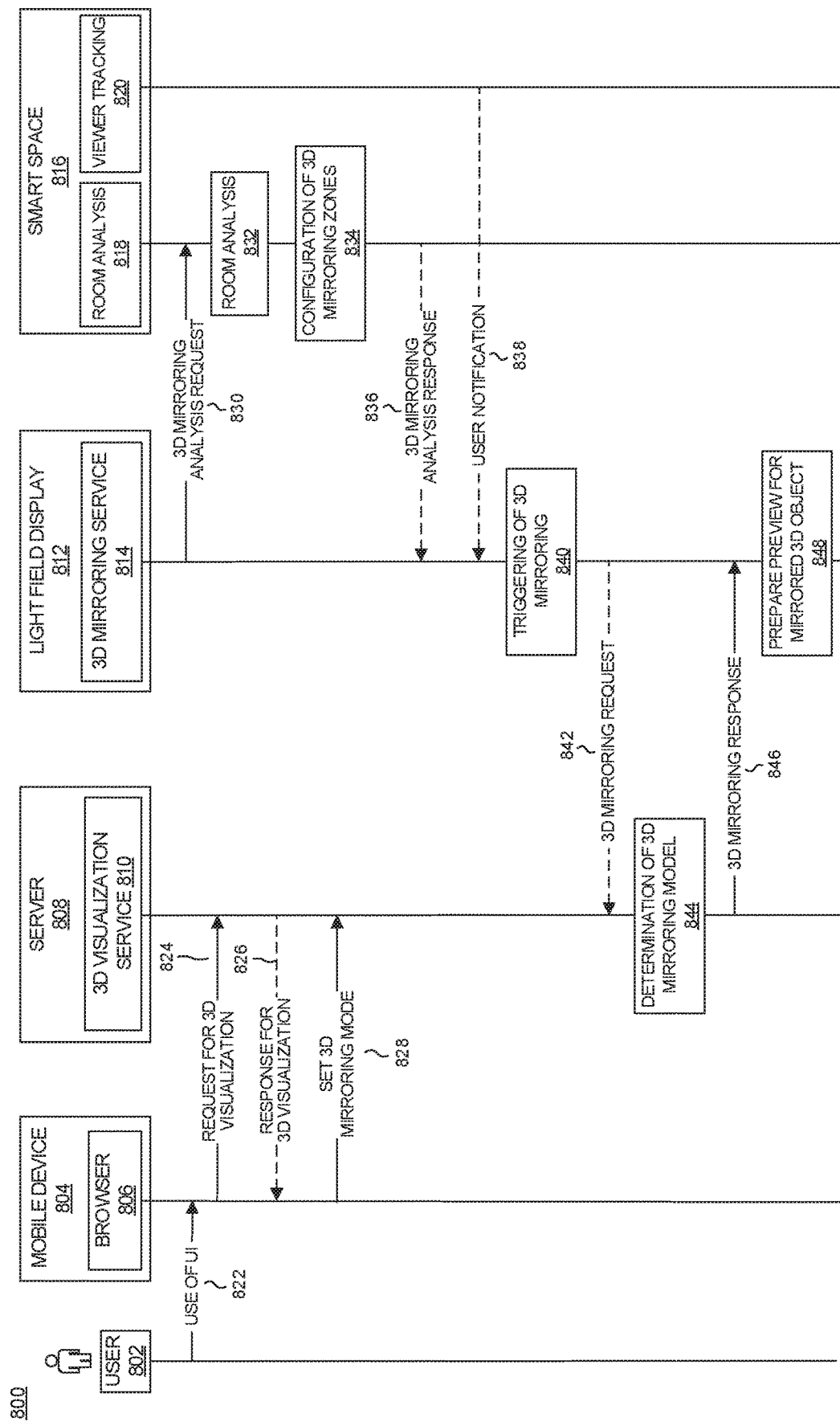
FIGS. 8A and 8B are a sequence diagram of a process for mirroring of 3D objects to a field of view of a light field display, in accordance with some embodiments.
Figure 8B:
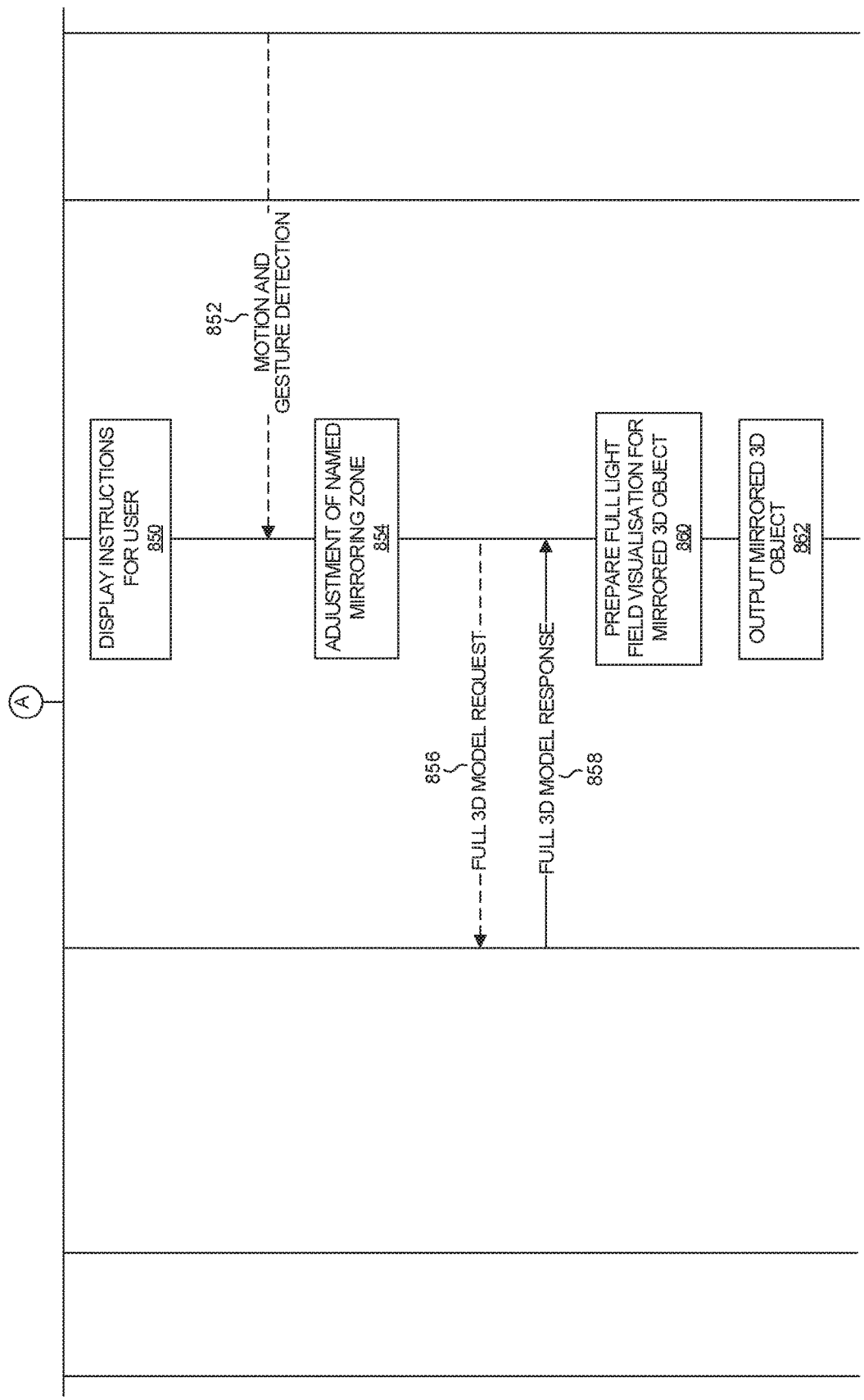

FIGS. 8A-8B form a sequence diagram of a process for mirroring of 3D objects to a field of view of a light field display, in accordance with some embodiments. The diagram depicts a user 802, mobile device 804 with browser 806, server 808 with 3D visualization service 810, light field display 812 with 3D mirroring service 814, and smart space 816 with room analysis service 818 and viewer tracking service 820. At 822, a user interacts with the user interface (UI) of a mobile device. For example, a user may select a 3D mode and/or a 3D object of interest in a 3D visualization service, e.g., using mobile device 804. At 824, mobile device 804 sends a request for 3D visualization to the server-side 3D visualization service 810. At 826, mobile device receives a response for 3D visualization from 3D visualization service 810. At 828, 3D visualization services receives a 3D mirroring mode e.g. a 3D mode determined or selected at the mobile device. At 830, 3D mirroring service 814 sends a 3D mirroring analysis request to room analysis service 818. The 3D mirroring analysis request may, for example, include a 3D display description. At 832, room analysis service 818 performs a room analysis. At 834, room analysis service 818 determines a configuration of 3D mirroring zones, e.g. to determine the optimal orientation to maximize visibility of the 3D mirroring zones in the room. The configuration of 3D mirroring zones may determine, for example, a room model and/or display description. At 836, the room analysis service returns the configured 3D mirroring zones in a 3D mirroring analysis response, which may include 3D mirroring zone descriptions. At 838 viewer tracking service 820 delivers to the 3D mirroring service a user notification message, which may include, for example, a viewer description regarding an identified tracked user. At 840, 3D mirroring service triggers 3D mirroring. The triggering of 3D mirroring may be based information included in the viewer description, 3D display description, and/or 3D mirroring zone descriptions, as previously described. At 842, 3D mirroring service 814 sends a 3D mirroring request to 3D visualization service. The 3D mirroring request may include viewer description and/or 3D display description information. At 844, 3D visualization service determines a 3D mirroring model and at 846 delivers a 3D mirroring response, e.g., including the 3D mirroring model. The 3D model may be determined, for example, based on a 3D mirroring display description and a 3D model for the object to be mirrored. At 848, 3D mirroring service 814 prepares a preview for the mirrored 3D object, e.g. based on the 3D mirroring model. At 850, 3D mirroring service 814 displays instructions for the user, e.g. to guide the user on how to adjust 3D object mirroring in the light field display via adjustment of 3D mirroring parameters. At 852, viewer tracking service 820 provides 3D mirroring service 814 with motion and gesture detection information. At 854, 3D mirroring service 814 performs adjustment of the named mirroring zone (e.g. to adjust preferred size, orientation, location, etc. of the 3D object). At 856, 3D mirroring service 814 sends to the 3D visualization service 810 a full 3D model request, which may contain a 3D object identifier. At 858, the 3D visualization service 810 provides the 3D mirroring service a full 3D model response, containing, e.g. a full (e.g. high quality) 3D model. At 860, 3D mirroring service prepares a full light field visualization for the mirrored 3D object. At 862, the 3D mirroring service outputs the mirrored 3D object, e.g. for visual display.

The locations of the modules depicted in FIG. 6 and FIGS. 8A-8B are provided merely as an example in accordance with some embodiments. The locations of the modules may vary; for example, the modules used for viewer and gesture tracking may be deployed to a light field display or to the smart space in which the light field display is located.

Figure 10:
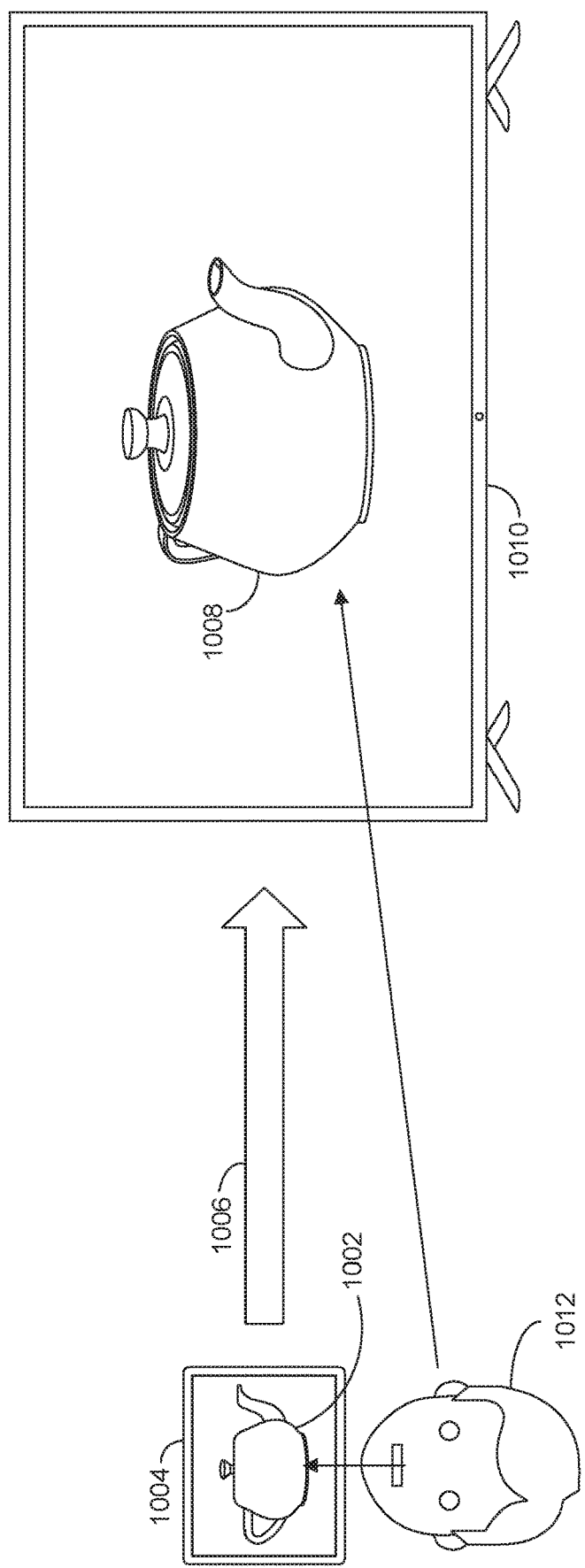
FIG. 10 depicts an example of mirroring 3D objects from a personal display to a group display while preserving the orientation and scale of the 3D objects from the perspective of the viewer, in accordance with some embodiments.

FIG. 10 depicts an example of mirroring 3D objects from a personal display to a group display, while preserving the orientation and scale of the 3D objects from the perspective of the viewer, in accordance with some embodiments. A virtual object 1002 is displayed on a 2D display device 1004, which may be a personal display device such as a phone or tablet. The tablet provides parameters 1006 that are used to display another version 1008 of the virtual object on a 3D display, which may be a light field display or other autostereoscopic display. The orientation of the virtual object 1008 on the 3D display may be selected based at least in part on the orientation of the virtual object 1002 on the 2D display and on the location of the user 1012. For example, the orientation of the virtual object 1008 on the 3D display may be selected such that the virtual objects 1002 and 1008 have substantially the same orientation relative to the user.

Figure 11:
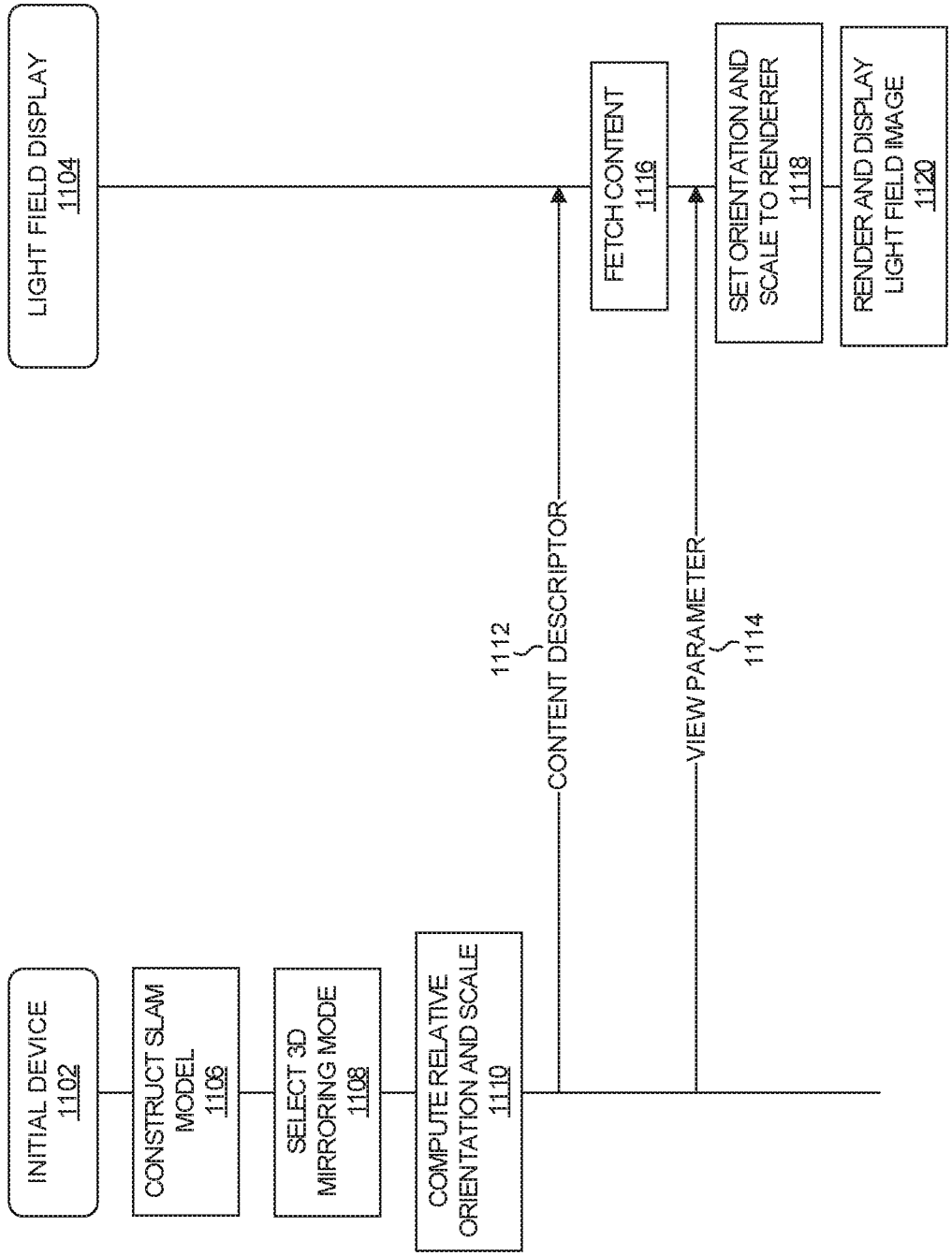
FIG. 11 is a sequence diagram of a first example process for mirroring 3D content from an initial device to a light field display, in accordance with some embodiments.

FIG. 11 is a sequence diagram of an example process for mirroring 3D content from an initial device to a light field display or other autostereoscopic display, in accordance with some embodiments. In the method of FIG. 11, an initial device 1102 with an initial display (e.g., a mobile phone) tracks viewer position and relative size and location of a second display of a second device (e.g., light field display 1104). At 1106, an SLAM model is constructed. At 1108, a 3D mirroring mode is selected. For example, the user may initiate the mirroring or transfer of content from the initial device to the second device by selecting a mirroring mode. Based on the selected mode, parameters describing the scale and orientation to be used in presenting the content on the second display are computed. The calculated scale factor (relative to the size of the second display) may be chosen to present the content at the same apparent size to the viewer as seen on the smaller but nearer initial display. The orientation to be used on the second display may be chosen so that the viewer sees the object in the same orientation on the second display as it appears when viewed on the initial display. At 1112, a content descriptor (e.g. a URL for fetching content) is shared with the second device. At 1114, view parameters (for example, a scale parameter and a viewing orientation parameter) are shared with the second display. The content descriptor and view parameters may be sent together (e.g. as a single content description) or sent separately. At 1116, the second device fetches the content (e.g. via internet). At 1118, the second device sets the scale and viewing orientation appropriately before rendering to the second display. At 1120, the light field image is rendered and displayed.

Figure 12:
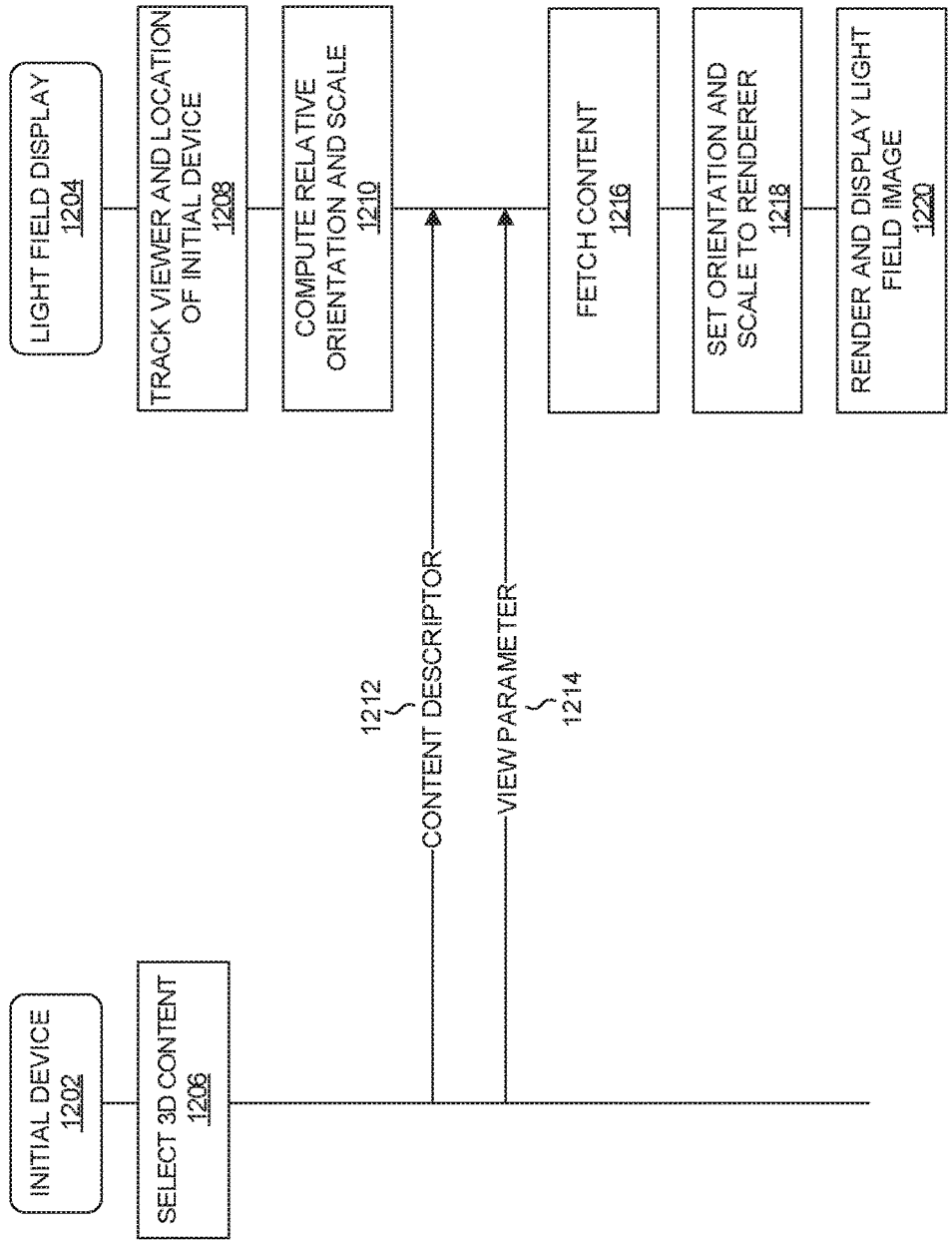
FIG. 12 is a sequence diagram of a second example process for mirroring 3D content from an initial device to a light field display, in accordance with some embodiments.

FIG. 12 is a sequence diagram of a second example process for mirroring 3D content from an initial device to a light field display, in accordance with some embodiments. At 1206, 3D content is selected at the initial device. At 1208, light field display 1204 tracks the viewer and the location of the initial device. At 1210, the light field display computes the relative orientation and scale. At 1212 a content descriptor (e.g. a URL for fetching content) is shared with the second device. At 1214, view parameters may be shared with the second light field display. At 1216, the light field display 1204 fetches the content (e.g. via internet). At 1218, the light field display sets the scale and viewing orientation appropriately before rendering to the second display. At 1220, the light field image is rendered and displayed.

4. Example Use Case

In an example illustrated in FIG. 13A-13D, different 2D representations 1304a-1304d of a virtual 3D object 1306 (in this example, a virtual model of a car) are displayed on a 2D display device 1302. The object orientation of the virtual 3D object 1306 is different in the different FIGS. 13A-13D. In the example, the object orientation of the virtual 3D object with respect to the 2D display device may be represented with respect to a coordinate system in which an $x_{2D}$ axis extends to the right of the 2D display device, a $y_{2D}$ axis extends toward the top of the 2D display device, and a $Z_{2D}$ axis extends perpendicular to the surface of the 2D display device in a direction toward a user of the display device. The object orientation of the virtual 3D object 1306 may be characterized using other angles, such as Euler angles or altitude and azimuth angles, or by other techniques such as vectors or points on a unit sphere. In this example, the object orientation of the virtual 3D object is characterized by an orientation angle $\beta$ that represents a rotation around the $y_{2D}$ axis. The principles explained here with respect to rotation around the $y_{2D}$ axis can similarly be applied to rotations around other axes or rotations in other directions.

Figure 13D:
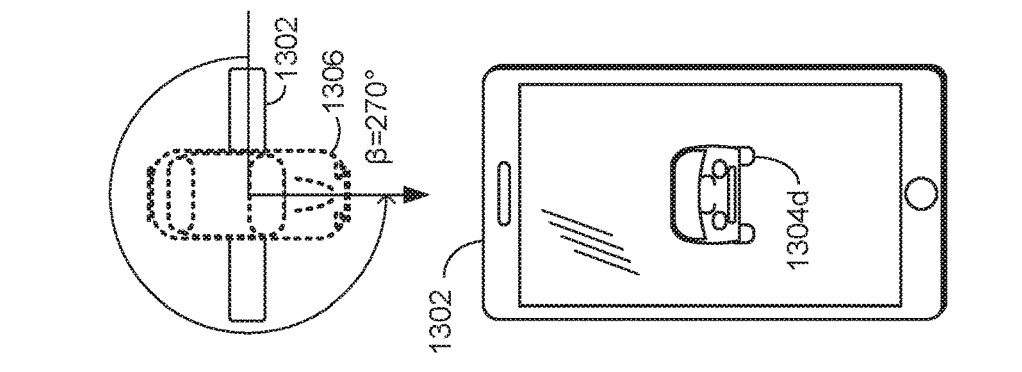
FIGS. 13A-13D are schematic front (bottom row) and top (upper row) views of a 2D display device illustrating different object orientations for display of a virtual object.
Figure 13C:
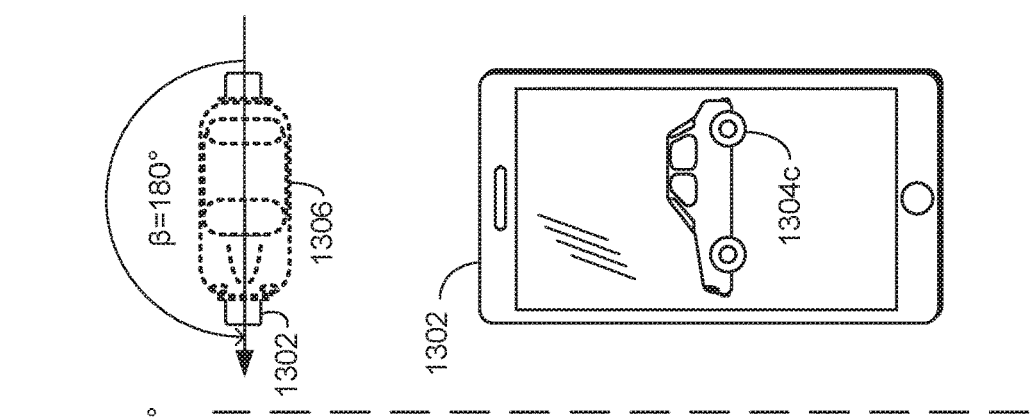
Figure 13B:
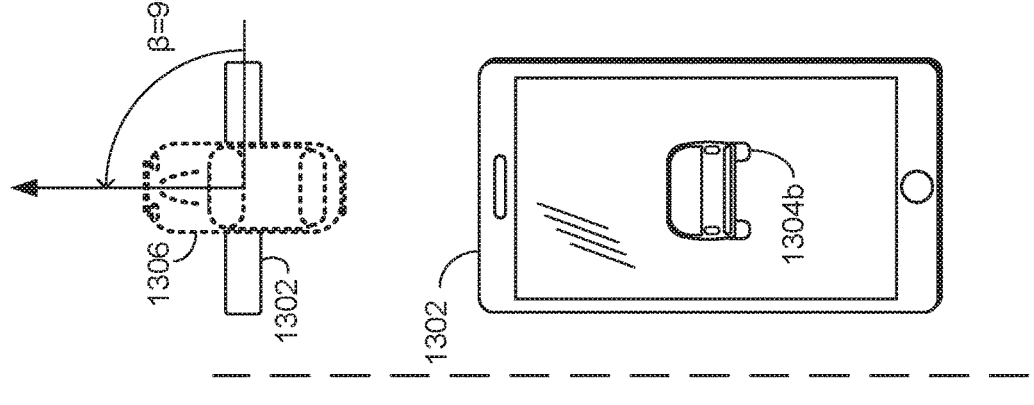
Figure 13A:
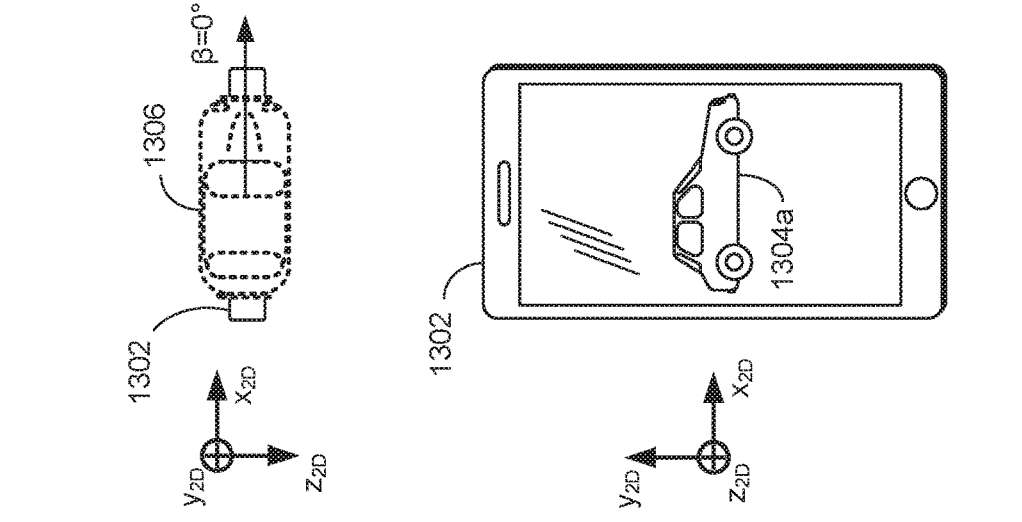

In the example of FIG. 13A, the virtual 3D object 1306 is displayed as a 2D representation 1304a with an object orientation characterized by the angle $\beta=0°$. In the example of FIG. 13B, the virtual 3D object 1306 is displayed as a 2D representation 1304b with an object orientation characterized by the angle $\beta=90°$. In the example of FIG. 13C, the virtual 3D object 1306 is displayed as a 2D representation 1304c with an object orientation characterized by the angle $\beta=180°$. And in the example of FIG. 13D, the virtual 3D object 1306 is displayed as a 2D representation 1304d with an object orientation characterized by the angle $\beta=270°$.

A user of a 2D display device such as device 1302 may provide an instruction (e.g. through selecting an icon) to mirror the virtual 3D object to a 3D display system, such as a light field display or other autostereoscopic display.

Figure 14A:
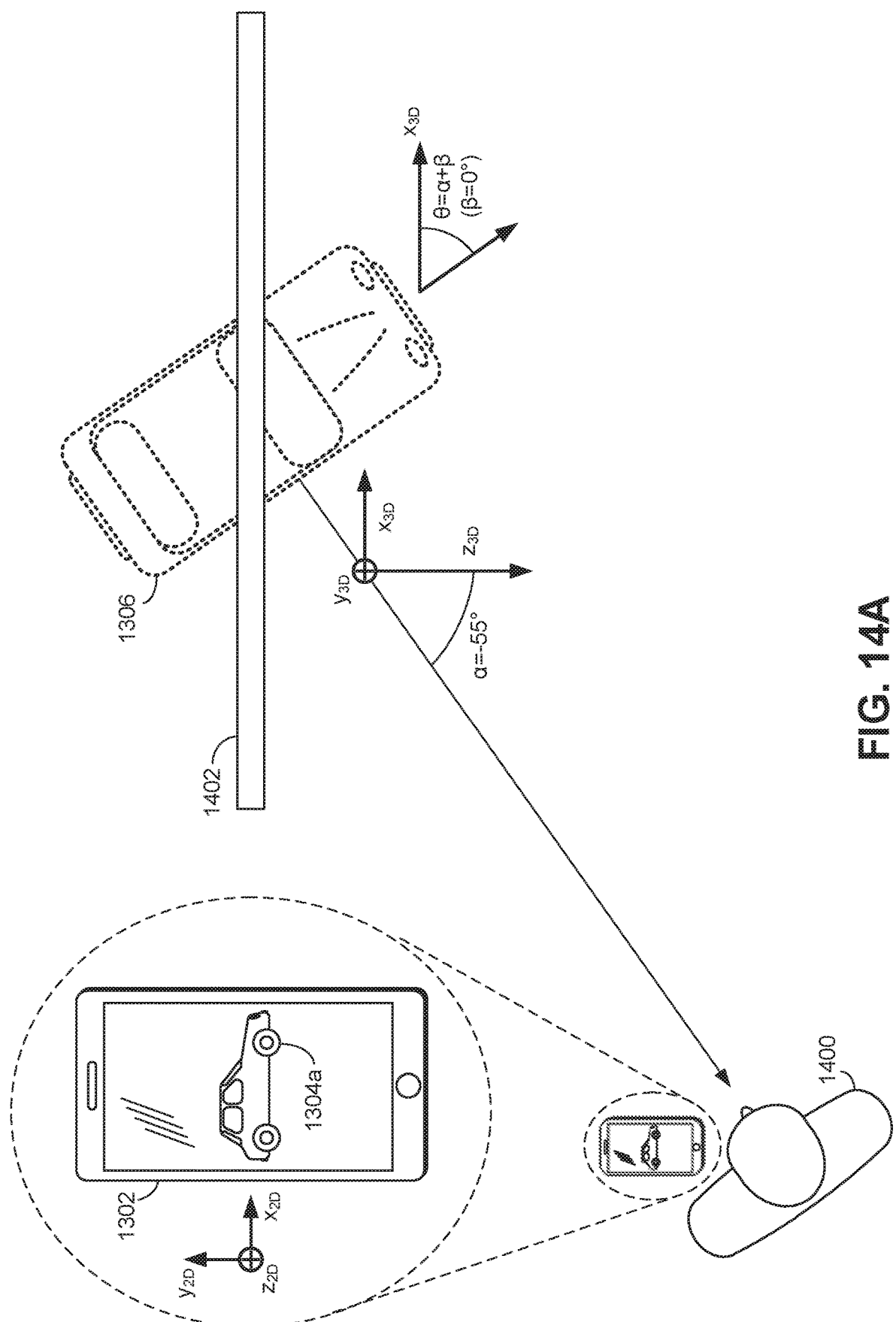
FIG. 14A is a schematic top view illustrating orientations of a virtual object and representations thereof in a method of mirroring 3D content in some embodiments.

FIG. 14A illustrates one such example of a mirroring process. In the example of FIG. 14A, a user 1400 of 2D display device 1302 is viewing representation 1304a of the virtual 3D object 1306 with an object orientation characterized by the angle $\beta=0°$ giving the user a perspective view of the right side of the car represented by the virtual 3D object

1306. The user 1400 enters an instruction to mirror the virtual 3D object 1306 to a 3D display system 1402 (viewed from above in FIG. 14A). In response to the user instruction, the 2D display device 1302 sends, to the 3D display system 1402, information that identifies the virtual 3D object and information that identifies the object orientation at the 2D display device.

The information identifying the virtual 3D object may include 3D model information such as one or more polygon meshes and texture information, or the information identifying the virtual 3D object may include a link or other address that the 3D display system can use to obtain the 3D model information.

In the example of FIG. 14A, the 3D display system is 1402 integrated into a single display device. In some embodiments, the display system may include separate components, such as a separate display device and controller. In such embodiments, the instructions for mirroring the virtual 3D object may be received by the controller (or other component) of the 3D display system rather than by the display device itself.

In the example of FIG. 14A, the 3D display system 1402 receives the information identifying the virtual 3D object 1306 and the information identifying the object orientation used by the 2D display device, which in this example indicates that 13=0°.

The 3D display system determines a viewing direction from the 3D display device of the 3D display system 1402 to the user 1400 of the 2D display device. In some embodiments, the 3D display system determines this viewing direction by receiving the direction from an external entity, such as from a SLAM system or from the 2D display device 1302. In other embodiments, the 3D display system operates to determine the viewing direction to the user, e.g. with the user of a camera. In some embodiments, the position of the user 1400 is inferred based on the position of the 2D display device. For example, the 2D display device may emit an RF signal that allows for localization of the device. In some embodiments, the position of the 2D display device may be used as the position of the user. In other embodiments, the user's position may be extrapolated from the position of the 2D display device, e.g. by assuming that the user's eyes are 50 cm (or some other distance) above or in front of a screen of the 2D display device.

In some embodiments, the position of the user may be determined based on input from the user. For example, the user may provide input (either directly to the 3D display system or through the 2D display device) of which mirroring zone the user is in or which zone the user wishes to use. The 3D display device may inform the user which zone he is occupying by displaying different zone identifiers in different mirroring zones, or other information may be used to allow a user to select a zone.

The 3D display system 1402 determines an object orientation for displaying the virtual 3D object 1306. The orientation may be determined based on the object orientation conveyed by the 2D display device and on the viewing direction to the user. Additional factors may be considered in some embodiments. In the example of FIG. 14A, the object orientation is selected such that an apparent orientation of the 3D representation, viewed from the position of the user 1400, corresponds to the first object orientation as displayed on the 2D display device. For example, because the 2D display device is showing the right side of the virtual car, the 3D display device will display the virtual car with its right side facing the user 1400. The 3D display system then displays the 3D representation of the virtual 3D object 1306 on the 3D display device using the determined object orientation.

In the example of FIG. 14A, the viewing direction from the 3D display device to the user 1400 is characterized by an angle α. To provide an object orientation such that the apparent orientation of the 3D representation (as seen by the user 1400) corresponds to the object orientation displayed on the 2D display device, the 3D display system combines the orientation angle β, received from the 2D display device, with the angle α, representing the viewing direction angle, to give a display angle θ to use for displaying the virtual object 1306 on the 3D display device 1402. In the example of FIG. 14A, the angles α and β are combined by addition such that θ=α+β. In this example, θ, α, and β all represent counterclockwise rotation as seen from above. (The viewer 1400 is displaced in a clockwise fashion from a normal to the 3D display, giving a negative viewing direction angle.) However, other sign notations or coordinate systems may be used in other embodiments. The resulting orientation of the virtual object 1306 is illustrated schematically as a plan view in FIG. 14A and as a perspective view in FIG. 14B.

Figure 14B:
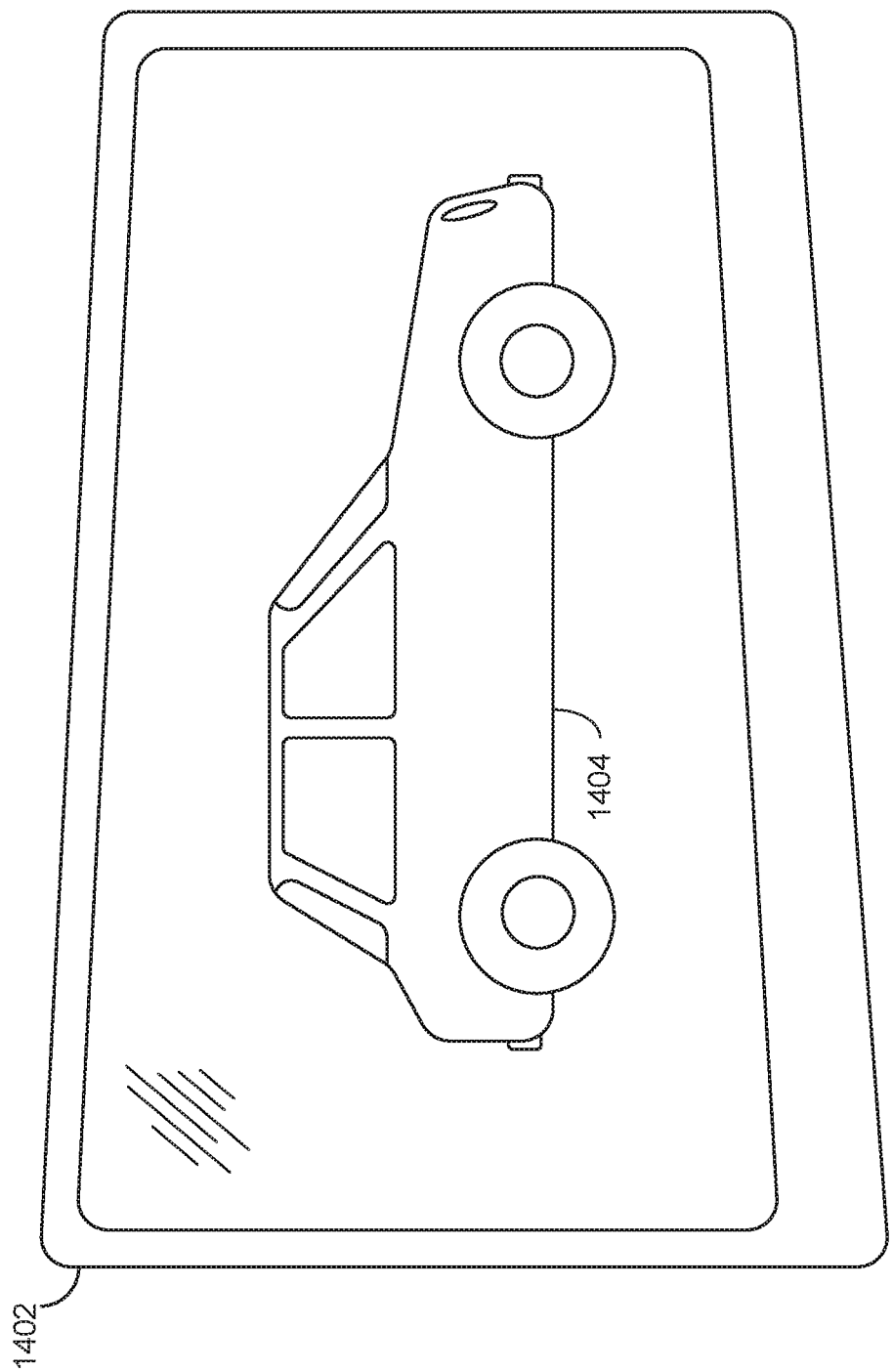
FIG. 14B is a schematic drawing illustrating a view of a 3D display from a users perspective according to the embodiment of FIG. 14A.

FIG. 14B is a perspective view of the display device 1402 from the perspective of the user 1400. As seen in FIG. 14B, the apparent orientation of the 3D representation 1404, as seen from the user's perspective, corresponds to the object orientation displayed on the 2D display as 2D representation 1304a. If the object orientation had not been rotated by an amount corresponding to the viewing direction angle α, then the users view of the 3D representation 1404 would be a view from the right-rear of the virtual car, thus failing to properly mirror the view as displayed on the 2D display, from the user's perspective.

Figure 15A:
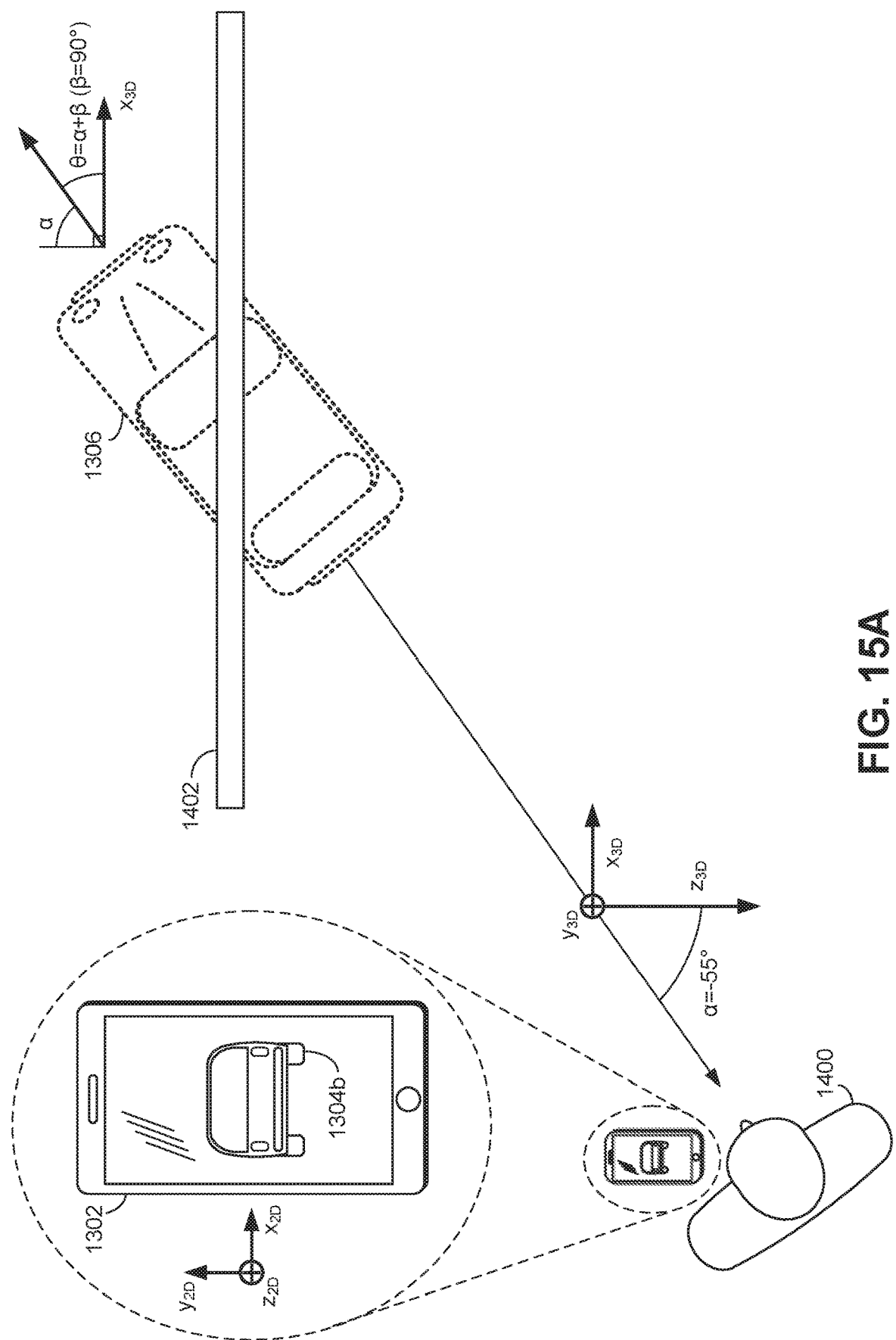
FIG. 15A is a schematic top view illustrating orientations of a virtual object and representations thereof in a method of mirroring 3D content in some embodiments.

FIG. 15A illustrates another example of a mirroring process. In the example of FIG. 15A, the user 1400 of the 2D display device 1302 is viewing representation 1304b of the virtual 3D object 1306 with an object orientation characterized by the angle β=90° giving the user a perspective view of the rear of the car represented by the virtual 3D object 1306. The user 1400 enters an instruction to mirror the virtual 3D object 1306 to a 3D display system 1402 (viewed from above in FIG. 15A). In response to the user instruction, the 2D display device 1302 sends, to the 3D display system 1402, information that identifies the virtual 3D object and information that identifies the object orientation at the 2D display device.

In the example of FIG. 15A, the 3D display system 1402 receives the information identifying the virtual 3D object 1306 and the information identifying the object orientation used by the 2D display device, which in this example indicates that β=90°.

The 3D display system determines a viewing direction from the 3D display device of the 3D display system 1402 to the user 1400 of the 2D display device and determines an object orientation for displaying the virtual 3D object 1306. The orientation may be determined based on the object orientation conveyed by the 2D display device and on the viewing direction to the user. In the example of FIG. 15A, the object orientation is selected such that an apparent orientation of the 3D representation, viewed from the position of the user 1400, corresponds to the object orientation as displayed on the 2D display device. For example, because the 2D display device is showing the rear of the virtual car, the 3D display device will display the virtual car with its rear facing the user 1400. The 3D display system then displays the 3D representation of the virtual 3D object 1306 on the 3D display device using the determined object orientation.

In the example of FIG. 15A, the viewing direction from the 3D display device to the user 1400 is characterized by an angle α. To provide an object orientation such that the apparent orientation of the 3D representation (as seen by the user 1400) corresponds to the object orientation displayed on the 2D display device, the 3D display system combines the orientation angle β, received from the 2D display device, with the angle α, representing the viewing direction angle, to give a display angle θ to use for displaying the virtual object 1306 on the 3D display device 1402. The resulting orientation of the virtual object 1306 is illustrated schematically as a plan view in FIG. 15A and as a perspective view in FIG. 15B.

Figure 15B:
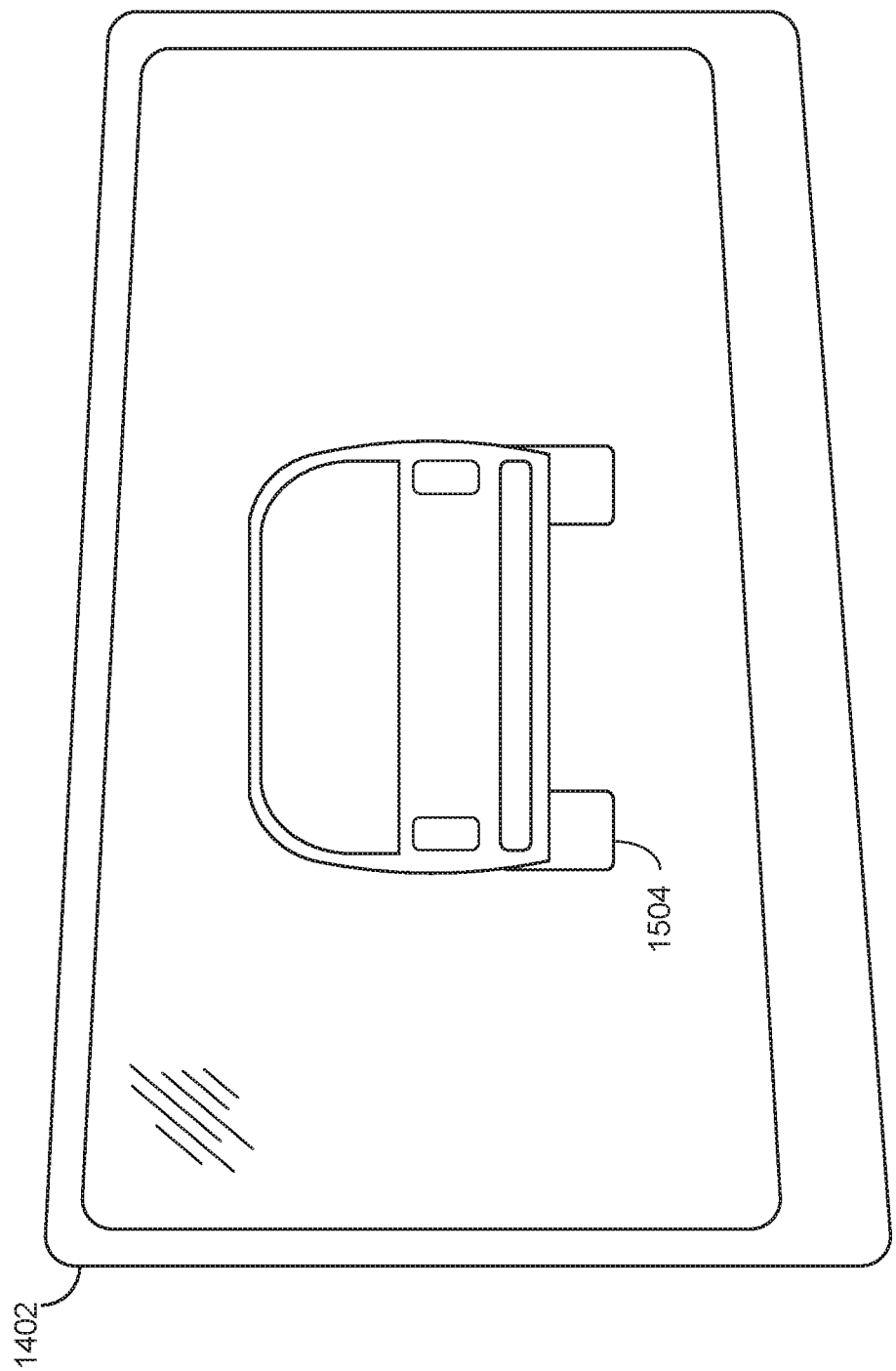
FIG. 15B is a schematic drawing illustrating a view of a 3D display from a users perspective according to the embodiment of FIG. 15A.

FIG. 15B is a perspective view of the display device 1402 from the perspective of the user 1400. As seen in FIG. 15B, the apparent orientation of the 3D representation 1504, as seen from the user's perspective, corresponds to the object orientation displayed on the 2D display as 2D representation 1304*b*. If the object orientation had only been rotated by an angle β=90°, and not by an amount corresponding to the viewing direction angle α, then the user's view of the 3D representation 1504 would be a view from the left-rear of the virtual car, thus failing to properly mirror the view as displayed on the 2D display, from the perspective of the user.

In some embodiments, once mirroring has begun, the 2D display device may receive user input changing the object orientation displayed at the 2D device. Responsive to the user input, the 2D display device may send information identifying the change in the first object orientation to the 3D display system. The 3D display system may receive the information identifying the change in the first object orientation, modify the 3D object orientation in accordance with the change in the first object orientation, and display the 3D representation of the virtual 3D object on the 3D display device using the modified second object orientation. For example, if an object is originally displayed by the 3D display at a display angle θ=α+β, and the user of the 2D device locally changes the object orientation from β to β+Δβ, then the display angle on the 3D display device may change to θ=α+β+Δβ. Similarly, if the user of the 2D device changes position with respect to the 3D display device, then the display angle on the 3D display device may, in some embodiments, change to θ=α+β+Δα. However, in other embodiments, the display angle on the 3D device may remain unchanged when the user changes position, allowing the user to "walk around" the 3D representation once its original orientation has been determined.

In some embodiments, a mirroring operation includes control over the size of the 3D representation of the virtual object. An example of such an embodiment is illustrated in FIG. 16. In some embodiments, in response to a user mirroring instruction, the 2D display device sends scale information to the 3D display device. The scale information may include information indication a display size of the 2D representation on the 2D display device. In such embodiments, the 3D display system may determine a display size for the virtual 3D object that is based at least in part on the received display size. The 3D representation of the virtual 3D object may be displayed on the 3D display device using the determined display size.

In some embodiments, the 2D display system may determine a first viewing distance from the 2D display device to a user of the 2D display device. In such embodiments, the display size on the 3D display device may be inversely proportional to the first viewing distance. In some embodiments, the 3D display system may determine a second viewing distance from the 3D display device to a user of the 2D display device. In such embodiments, the display size on the 3D display device may be proportional to the second viewing distance.

5. Further Embodiments

An example method for mirroring 3D objects from a first display to a second display in accordance with some embodiments may include: identifying the relative orientation and relative size of said first display and said second display; selecting a 3D mirroring mode; calculating view parameters based on said relative orientation, said relative size, and said 3D mirroring mode for rendering on said second display; and transmitting to said second display a description of 3D content and said view parameters.

For some embodiments of the example method, the second display may be a light field display.

For some embodiments of the example method, the second display may be an autostereoscopic display.

For some embodiments of the example method, the first display may be a 2D display.

For some embodiments of the example method, the first display may be a handheld display.

For some embodiments of the example method, said object parameters may include an orientation parameter.

For some embodiments of the example method, said object parameters include a scale parameter.

For some embodiments of the example method, the determination of relative locations may be done based on a SLAM model produced at the first display and the location of said second display is identified within the SLAM model.

For some embodiments of the example method, the determination of relative locations may be done through a smart space.

For some embodiments of the example method, the location of a viewer relative to said first display and said second display may be detected and used to calculate said orientation and scale parameters.

For some embodiments of the example method, the mirroring mode may direct that the apparent size of the object perceived by a viewer on said first display and said second display are equal, such that the object looks to be the same size on first and second displays.

For some embodiments of the example method, the mirroring mode may direct that the orientation of the object perceived by a viewer on said first display and said second display are equal, such that the viewer sees the same side of the object when on the first and second displays.

A further example method for mirroring 3D objects from a first display to a second display in accordance with some embodiments may include: receiving from said first display, a description of 3D content to display; receiving from said first display viewing parameters to describe the display of said 3D content; receiving 3D content defined by said description of 3D content; altering the representation of said 3D object based on said viewing parameters; and rendering light field visualization for said altered representation of 3D content.

For some embodiments of the further example method, the second display may be a light field display.

For some embodiments of the further example method, the second display may be an autostereoscopic display.

For some embodiments of the further example method, the first display may be a 2D display.

For some embodiments of the further example method, the first display may be a handheld display.

For some embodiments of the further example method, the description of 3D content may include a URL.

For some embodiments of the further example method, said viewing parameters may include an orientation parameter.

For some embodiments of the further example method, said viewing parameters may include a scale parameter.

For some embodiments of the further example method, the determination of relative locations may be done by said second display.

For some embodiments of the further example method, the second display may fetch content for said specified orientation.

An example method for mirroring 3D objects from a first display to a second display may include: receiving from said first display, a description of 3D content to display; receiving from said first display, parameters defining the view of said content on said first display; tracking the relative location of said first display and said second display; receiving 3D content defined by said description of 3D content; altering the representation of said 3D object based on said viewing parameters; and rendering light field visualization for said altered representation of 3D content.

For some embodiments of the example method, the second display may be a light field display.

For some embodiments of the example method, the second display may be an autostereoscopic display.

For some embodiments of the example method, the first display may be a 2D display.

For some embodiments of the example method, the first display may be a handheld display.

For some embodiments of the example method, the description of 3D content may include a URL.

For some embodiments of the example method, said viewing parameters may include an orientation parameter.

For some embodiments of the example method, said viewing parameters may include a scale parameter.

For some embodiments of the example method, the determination of relative locations may be done by said second display.

For some embodiments of the example method, the second display may fetch content for said specified orientation.

In some embodiments, a method of mirroring a 3D object from a first display to a second display may include: determining a relative orientation of the second display relative to the first display; determining a relative size of the second display relative to the first display; selecting a 3D mirroring mode; calculating a set of view parameters based on the relative orientation, the relative size, and the 3D mirroring mode; and transmitting to the second display a description of the 3D object and the set of view parameters.

In some embodiments, a method of mirroring a 3D object from a first display to a second display may include: receiving from the first display a 3D content description; receiving from the first display a set of viewing parameters; receiving 3D content based on the received 3D content description; rendering, at the second display, a light field visualization based on the received 3D content and the set of viewing parameters.

In some embodiments, a method of mirroring a 3D object from a first display to a second display may include: receiving from the first display a 3D content description; receiving from the first display a set of viewing parameters; receiving 3D content based on the received 3D content description; tracking a location of the first display relative to the second display; and rendering, at the second display, a light field visualization based on the received 3D content, the set of viewing parameters, and the tracked location of the first display.

In some embodiments, an example method may include: initially displaying a 3D object on a first display; determining a position and orientation of the first display relative to a second display; determining mirrored-object orientation information based on the position and orientation of the first display relative to the second display; and sending to the second display a request to display the 3D object, wherein the request includes the mirrored-object orientation information.

For some embodiments of the example method, the initially-displayed 3D object may have a face directed toward a user, and the mirrored-object orientation information may describe an orientation of the mirrored 3D object such that the same face of the mirrored 3D object is directed toward the user.

An example apparatus in accordance with some embodiments may include a processor and a non-transitory computer-readable medium storing instructions operative to perform any of the methods listed above.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising, at a 3D display system:
  receiving from a 2D display device information identifying a virtual 3D object and information identifying a first object orientation of the virtual 3D object;
  determining a viewing direction from a 3D display device of the 3D display system to a user of the 2D display device;

determining a second object orientation for the virtual 3D object based on the first object orientation and the viewing direction, the second object orientation including an angle around a vertical axis of the 3D display system; and displaying a 3D representation of the virtual 3D object on the 3D display device using the second object orientation.

2. The method of claim 1, further comprising, at the 2D display device:

displaying a 2D representation of the virtual 3D object, the 2D representation being displayed with the first object orientation;

receiving a user instruction to mirror the virtual 3D object to the 3D display system; and in response to the user instruction, sending, to the 3D display system, the information identifying the virtual 3D object and the information identifying the first object orientation.

3. The method of claim 2, wherein the information identifying the first object orientation includes information identifying at least a first orientation angle ($\beta$) of the 2D representation of the virtual 3D object on the 2D display device.

4. The method of claim 3, wherein determining the second object orientation includes combining the first orientation angle ($\beta$) with a viewing direction angle ($\alpha$) that characterizes the viewing direction to generate a display angle ($\theta$) that characterizes the second object orientation.

5. The method of claim 2, further comprising, at the 2D display device:

receiving user input changing the first object orientation; and responsive to the user input, sending information identifying the change in the first object orientation to the 3D display system.

6. The method of claim 5, further comprising at the 3D display system:

receiving the information identifying the change in the first object orientation;

modifying the second object orientation in accordance with the change in the first object orientation; and displaying the 3D representation of the virtual 3D object on the 3D display device using the modified second object orientation.

7. The method of claim 1, further comprising receiving scale information from the 2D display device, the scale information indicating a first display size of the 2D representation.

8. The method of claim 7, further comprising, at the 3D display system:

determining a second display size for the virtual 3D object based at least in part on the first display size, wherein the 3D representation of the virtual 3D object is displayed on the 3D display device using the second display size.

9. The method of claim 8, further comprising, at the 3D display system:

determining a viewing distance from the 3D display device to a user of the 2D display device, wherein the second display size is proportional to the viewing distance.

10. The method of claim 1, wherein the 3D display device is an autostereoscopic display.

11. The method of claim 1, wherein the 3D display device is a light field display.

12. The method of claim 1, wherein the information identifying the virtual 3D object comprises 3D model information.

13. The method of claim 1, wherein the information identifying the virtual 3D object comprises a link to 3D model information.

14. The method of claim 1, wherein determining a viewing direction from a 3D display device of the 3D display system to a user of the 2D display device comprises determining a position of the 2D display device.

15. The method of claim 1, wherein determining a viewing direction from a 3D display device of the 3D display system to a user of the 2D display device is performed using a camera of the 3D display system.

16. A method comprising:

displaying a 2D representation of a virtual 3D object on a 2D display device, the 2D representation being displayed with a first object orientation of the virtual 3D object;

determining a viewing direction of a user of the 2D display device with respect to a 3D display device; and displaying a 3D representation of the virtual 3D object on the 3D display device, the 3D representation being displayed with a second object orientation that is determined based at least in part on the first object orientation and the viewing direction of the user, the second object orientation including an angle around a vertical axis of the 3D display device, wherein the second object orientation is selected such that an apparent orientation of the 3D representation, viewed from the viewing direction of the user, corresponds to the first object orientation.

17. The method of claim 16, wherein determining the viewing direction of the user is performed using a camera.

18. A 3D display system comprising at least one processor configured to perform:

receiving from a 2D display device information identifying a virtual 3D object and information identifying a first object orientation of the virtual 3D object;

determining a viewing direction from a 3D display device of the 3D display system to a user of the 2D display device;

determining a second object orientation for the virtual 3D object based on the first object orientation and the viewing direction, the second object orientation including an angle around a vertical axis of the 3D display device; and displaying a 3D representation of the virtual 3D object on the 3D display device using the second object orientation.

19. The system of claim 18, wherein the information identifying the first object orientation includes information identifying at least a first orientation angle ($\beta$) of the 2D representation of the virtual 3D object on the 2D display device.

20. The system of claim 18, wherein determining a viewing direction from a 3D display device of the 3D display system to a user of the 2D display device is performed using a camera of the 3D display system.

* * * * *